(12) United States Patent
Islam et al.

(10) Patent No.: US 11,585,994 B2
(45) Date of Patent: Feb. 21, 2023

(54) ACTIVE OPTICAL CABLE ASSEMBLIES

(71) Applicant: CommScope Technologies LLC, Hickory, NC (US)

(72) Inventors: Nahid Islam, Westmont, IL (US); Anthony Leonard LeFebvre, Edina, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/322,043

(22) Filed: May 17, 2021

(65) Prior Publication Data
US 2021/0364715 A1 Nov. 25, 2021

Related U.S. Application Data

(60) Provisional application No. 63/027,467, filed on May 20, 2020.

(51) Int. Cl.
*H04B 10/00* (2013.01)
*G02B 6/42* (2006.01)

(52) U.S. Cl.
CPC ......... *G02B 6/4293* (2013.01); *G02B 6/4219* (2013.01); *G02B 6/4279* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,111,514 A * | 9/1978 | Brishka | ............... | H01R 13/64 285/914 |
| 5,274,729 A * | 12/1993 | King | ............... | G02B 6/264 385/59 |
| 5,481,634 A * | 1/1996 | Anderson | ............ | G02B 6/3888 385/60 |
| 5,943,462 A * | 8/1999 | Schofield | ............. | G02B 6/3887 385/100 |
| 6,269,214 B1 * | 7/2001 | Naudin | ............... | G02B 6/4446 385/135 |
| 6,487,344 B1 * | 11/2002 | Naudin | ............... | H02G 15/007 385/100 |

(Continued)

FOREIGN PATENT DOCUMENTS

WO 2011112764 A1 9/2011

OTHER PUBLICATIONS

"International Search Report and Written Opinion corresponding to International Application No. PCT/US2021/032674 dated Sep. 6, 2021".

(Continued)

*Primary Examiner* — Agustin Bello
(74) *Attorney, Agent, or Firm* — Myers Bigel, P.A.

(57) ABSTRACT

The present disclosure describes active optical cable assemblies. A cable assembly includes a fixed active optical connector having a transceiver, a ruggedized optical fiber cable integrated with the fixed active optical connector, a main cable assembly comprising one or more optical fiber cables, wherein the ruggedized cable is spliced to the main cable assembly; and a removable shroud configured to surround at least a portion of the fixed active optical connector plugged into a remote radio unit and to be secured to a remote radio unit. Active optical cable and remote radio unit systems are also described.

20 Claims, 20 Drawing Sheets

(56) References Cited

U.S. PATENT DOCUMENTS

| | | | | |
|---|---|---|---|---|
| 6,648,520 | B2* | 11/2003 | McDonald | G02B 6/3887 385/59 |
| 7,137,742 | B2* | 11/2006 | Theuerkorn | G02B 6/3847 385/53 |
| 7,264,402 | B2* | 9/2007 | Theuerkorn | G02B 6/3821 385/71 |
| 7,419,313 | B2* | 9/2008 | Jablonski | H01R 13/746 385/92 |
| 7,467,896 | B2* | 12/2008 | Melton | G02B 6/4429 385/86 |
| 7,614,797 | B2* | 11/2009 | Lu | G02B 6/3894 385/94 |
| 8,113,723 | B2* | 2/2012 | Togami | G02B 6/4246 385/75 |
| 8,184,939 | B2* | 5/2012 | Parikh | G02B 6/4477 385/135 |
| 8,272,790 | B2* | 9/2012 | Belsan | G02B 6/4284 398/135 |
| 8,313,250 | B2* | 11/2012 | Drouard | H02G 3/22 385/136 |
| 8,556,520 | B2* | 10/2013 | Elenbaas | G02B 6/387 385/53 |
| 8,573,855 | B2* | 11/2013 | Nhep | G02B 6/4472 385/86 |
| 8,708,577 | B2* | 4/2014 | Chan | G02B 6/4292 385/139 |
| 8,708,732 | B2 | 4/2014 | Toda et al. | |
| 8,737,786 | B1* | 5/2014 | Compton | G02B 6/4472 385/100 |
| 8,801,301 | B2* | 8/2014 | Bradley | G02B 6/3834 385/72 |
| 8,842,962 | B2* | 9/2014 | Beamon | G02B 6/4477 385/136 |
| 9,110,253 | B2* | 8/2015 | Tamekuni | G02B 6/3871 |
| 9,122,021 | B2* | 9/2015 | Elenbaas | G02B 6/3847 |
| 9,170,385 | B2* | 10/2015 | Van Der Mee | G02B 6/4284 |
| 9,223,093 | B2 | 12/2015 | Toda et al. | |
| 9,268,102 | B2* | 2/2016 | Daems | G02B 6/3888 |
| 9,482,819 | B2* | 11/2016 | Li | G02B 6/2938 |
| 9,664,862 | B2* | 5/2017 | Lu | G02B 6/3816 |
| 9,722,350 | B1* | 8/2017 | Baldwin | H01R 4/18 |
| 9,915,789 | B2* | 3/2018 | Beier | G02B 6/3891 |
| 9,952,396 | B2* | 4/2018 | Van Cauteren | G02B 6/4285 |
| 9,983,374 | B2* | 5/2018 | Li | G02B 6/4292 |
| 10,018,795 | B2* | 7/2018 | Dupeux | G02B 6/4284 |
| 10,036,862 | B2* | 7/2018 | Katagiyama | G02B 6/381 |
| 10,073,224 | B2* | 9/2018 | Tong | G02B 6/3869 |
| 10,101,538 | B2* | 10/2018 | Lu | G02B 6/3826 |
| 10,122,119 | B2* | 11/2018 | Bourgeas | G02B 6/3897 |
| 10,133,019 | B2* | 11/2018 | Kowalczyk | G02B 6/3887 |
| 10,168,485 | B2* | 1/2019 | Mueller-Schlomka | G02B 6/3897 |
| 10,177,495 | B2* | 1/2019 | Dupeux | G02B 6/4284 |
| 10,180,541 | B2* | 1/2019 | Coenegracht | G02B 6/3825 |
| 10,228,390 | B2* | 3/2019 | McGrath, Jr. | H02G 1/14 |
| 10,317,627 | B2* | 6/2019 | Beier | G02B 6/3869 |
| 10,353,150 | B2* | 7/2019 | Lichoulas | G02B 6/4246 |
| 10,359,577 | B2* | 7/2019 | Dannoux | G02B 6/3841 |
| 10,371,900 | B2* | 8/2019 | Kluwe | G02B 6/387 |
| 10,409,007 | B2* | 9/2019 | Kadar-Kallen | G02B 6/3809 |
| 10,444,442 | B2* | 10/2019 | Takano | G02B 6/3885 |
| 10,444,443 | B2* | 10/2019 | Coenegracht | G02B 6/3871 |
| 10,466,432 | B2* | 11/2019 | Luo | G02B 6/4285 |
| 10,559,914 | B2* | 2/2020 | Goossens | H01R 4/00 |
| 10,613,278 | B2* | 4/2020 | Kempeneers | H02G 15/007 |
| 10,739,540 | B2* | 8/2020 | Dupeux | G02B 6/428 |
| 11,137,564 | B2* | 10/2021 | Diepstraten | G02B 6/4472 |
| 11,187,859 | B2* | 11/2021 | Rosson | G02B 6/3831 |
| 11,237,341 | B2* | 2/2022 | Hu | G02B 6/3869 |
| 11,300,746 | B2* | 4/2022 | Dannoux | G02B 6/3893 |
| 11,307,359 | B2* | 4/2022 | Takano | G02B 6/381 |
| 11,307,364 | B2* | 4/2022 | Rosson | G02B 6/3887 |
| 2006/0120672 | A1* | 6/2006 | Cody | G02B 6/4472 385/86 |
| 2007/0025677 | A1* | 2/2007 | Harrison | G02B 6/4471 385/134 |
| 2007/0036489 | A1* | 2/2007 | Grzegorzewska | H01R 13/5202 385/86 |
| 2008/0175541 | A1* | 7/2008 | Lu | G02B 6/3821 385/62 |
| 2008/0248694 | A1* | 10/2008 | Togami | H01R 13/7197 439/620.05 |
| 2009/0003772 | A1* | 1/2009 | Lu | G02B 6/3897 385/60 |
| 2009/0060421 | A1* | 3/2009 | Parikh | G02B 6/4444 385/71 |
| 2009/0148104 | A1* | 6/2009 | Lu | G02B 6/3816 385/72 |
| 2010/0027955 | A1* | 2/2010 | Parikh | G02B 6/4477 385/135 |
| 2010/0260456 | A1* | 10/2010 | Alcaraz | G02B 6/3897 385/76 |
| 2011/0003501 | A1* | 1/2011 | Greub | G02B 6/3897 439/345 |
| 2012/0020628 | A1* | 1/2012 | Chan | G02B 6/4284 385/92 |
| 2013/0294731 | A1* | 11/2013 | Van Der Mee | G02B 6/4284 385/76 |
| 2014/0064671 | A1* | 3/2014 | Barnette, Jr. | G02B 6/389 29/428 |
| 2014/0112628 | A1* | 4/2014 | Keenum | G02B 6/428 29/829 |
| 2014/0133804 | A1* | 5/2014 | Lu | G02B 6/3877 385/60 |
| 2015/0378109 | A1* | 12/2015 | Samal | G02B 6/3809 385/58 |
| 2016/0266340 | A1* | 9/2016 | Zhang | G02B 6/4284 |
| 2017/0176690 | A1* | 6/2017 | Bretz | G02B 6/4479 |
| 2017/0212315 | A1* | 7/2017 | Kurashima | H01R 13/6335 |
| 2017/0343741 | A1* | 11/2017 | Coenegracht | G02B 6/3816 |
| 2018/0011268 | A1* | 1/2018 | Dupeux | H01R 13/53 |
| 2018/0013232 | A1* | 1/2018 | Bourgeas | H01R 13/62922 |
| 2018/0013235 | A1* | 1/2018 | Dupeux | H01R 13/53 |
| 2018/0259721 | A1* | 9/2018 | Bund | G02B 6/3879 |
| 2019/0004251 | A1* | 1/2019 | Dannoux | G02B 6/3851 |
| 2020/0241211 | A1* | 7/2020 | Shonkwiler | G02B 6/3809 |
| 2020/0393629 | A1* | 12/2020 | Hill | G02B 6/3897 |
| 2021/0364715 | A1* | 11/2021 | Islam | G02B 6/4219 |

OTHER PUBLICATIONS

"International Preliminary Report on Patentability corresponding to International Application No. PCT/US2021/032674 dated Dec. 1, 2022".

* cited by examiner

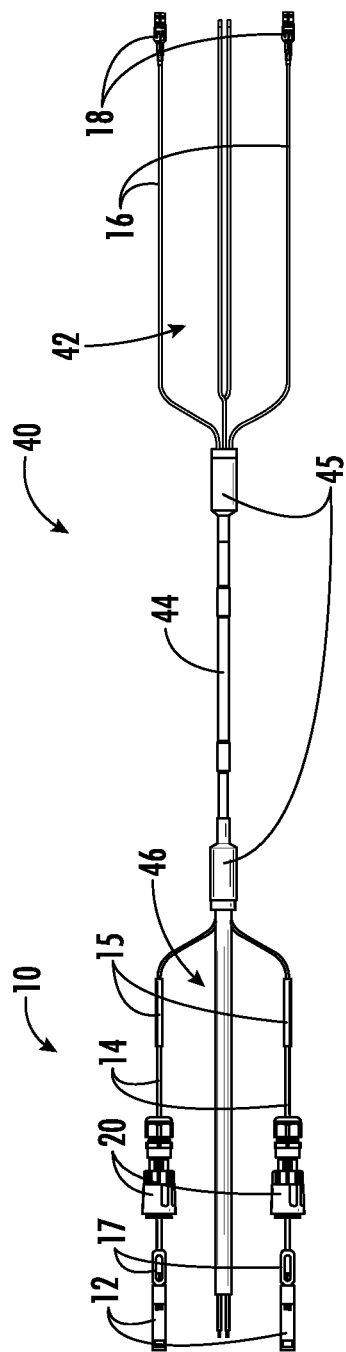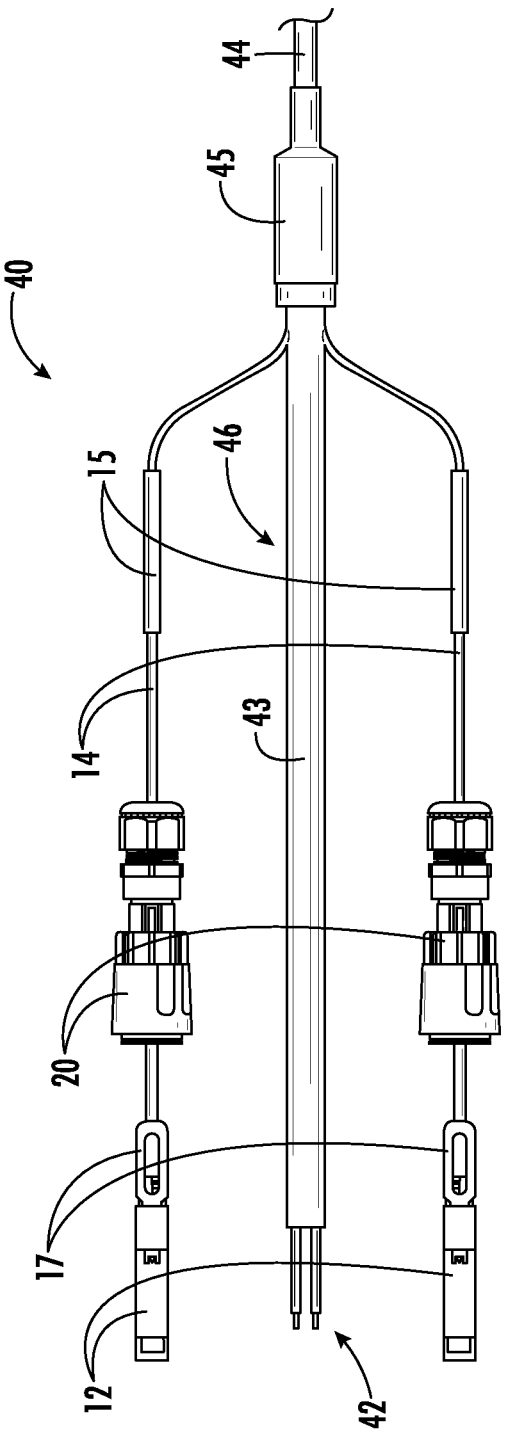
FIG. 10A
FIG. 10B

ACTIVE OPTICAL CABLE ASSEMBLIES

RELATED APPLICATION(S)

The present application claims priority from and the benefit of U.S. Provisional application Ser. No. 63/027,467, filed May 20, 2020, the disclosure of which is hereby incorporated herein in its entirety.

FIELD

The present application is directed generally toward telecommunications equipment, and more particularly, active optical cable assemblies and remote radio systems.

BACKGROUND

Traditional optical assemblies have optical connectors on both ends of the assembly. These assemblies may be connected to a remote radio unit (RRU), remote radio head (RRH) or active antenna at one end and a base band unit (BBU), another RRU, or other telecommunication equipment via a small form-factor pluggable (SFP) optical connector (i.e., the optical assembly is connected to one end of the SFP via an optical connector/adapter and the other end of the SFP (i.e., the copper connection end) may be inserted into the RRU, RRH, etc.) to create an active optical cable assembly. Active optical cables (AOC) represent a cabling technology that accepts the same electrical inputs as a traditional copper cable, but uses optical fiber between connectors. Thus, the SFP converts an optical signal to an electrical signal. Active optical cables use optical-to-electrical conversion on the cable ends to improve speed and distance performance of the cable without sacrificing compatibility with standard electrical interfaces.

Generally speaking, mating optical connectors mechanically couple and align the cores of optical fibers so light can pass. The better the connector, the better the optical cleanliness of the connection (i.e., less light is lost due to reflection or misalignment of the optical fibers). The optical connector interface (e.g., on the optical connector of the optical assembly and/or on the optical connector/adapter of the SFP) is very small and delicate (e.g., glass), and is susceptible to dust, scratches, etc. which can affect the optical cleanliness of the connection. Therefore, during installation, a technician must have a proper tool to inspect the ends for a clean and scratch-less optical interface. If the ends are dirty, the technician also must have a cleaning tool and requires that the technician have special skills to perform these tasks. In addition, the technician must also test the optical assembly for damage. Even after inspecting and cleaning the optical interface, in many instances, it is discovered during activation of the RRU that the SFP is defective. Currently, there is not a way for the technician to test the SFP in the field without installing it into the RRU. Thus, there may be a need for an active optical cable assembly that would allow for better optical cleanliness when used with, for example, a remote radio unit.

SUMMARY

A first aspect of the present invention is directed to an active optical cable assembly. The assembly may include a fixed active optical connector having a transceiver, a ruggedized optical fiber cable integrated with the fixed active optical connector, a main cable assembly comprising one or more optical fiber cables, wherein the ruggedized cable is spliced to the main cable assembly, and a removable shroud configured to surround at least a portion of the fixed active optical connector plugged into a remote radio unit and to be secured to a remote radio unit.

Another aspect of the present invention is directed to an active optical cable and remote radio unit system. The system may include a remote radio unit having at least one input port and an active optical cable assembly. The active optical cable assembly may include a fixed active optical connector having a transceiver, the fixed active optical connector being a small form-factor pluggable (SFP) optical connector configured to be plugged into the at least one input port of the remote radio unit, a ruggedized cable integrated with the fixed active optical connector, a main cable assembly, wherein the ruggedized cable is spliced to main cable assembly, and a removable shroud configured to be secured to the remote radio unit. The fixed active optical connector may be plugged into the at least one input port of the remote radio unit, and the removable shroud may surround at least a portion of the fixed active optical connector and may be secured to the remote radio unit, thereby protecting the connection between the fixed active optical connector and the remote radio unit.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE FIGURES

FIG. 10A is a side view of an exemplary hybrid cable assembly according to embodiments of the present invention.

FIG. 10B is an enlarged partial view of the hybrid cable assembly of FIG. 10A.

DETAILED DESCRIPTION

Figure 1:
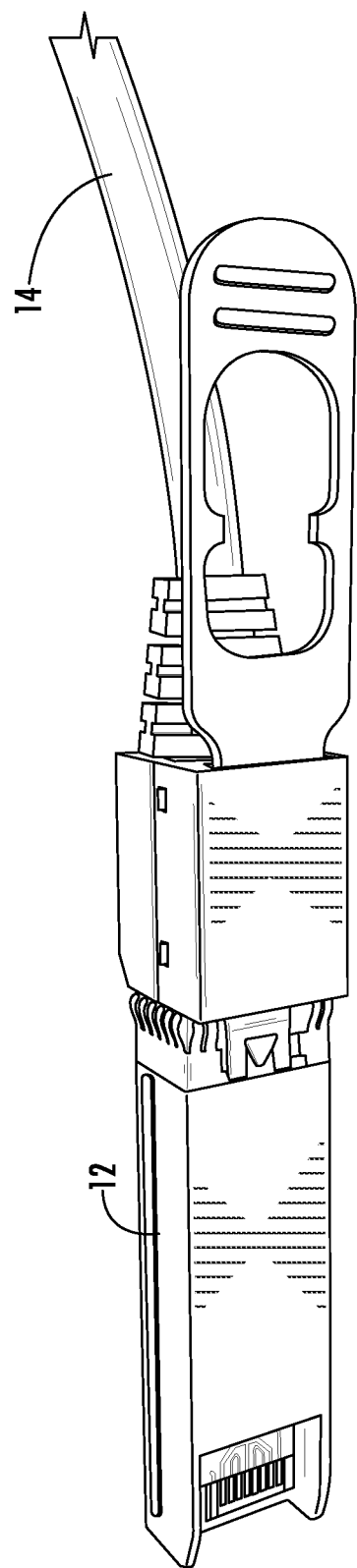
FIG. 1 is a photograph of an exemplary fixed active optical connector according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10'").

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, active optical cable assemblies are provided that may enhance the optical cleanliness of an optical connection. Active optical cable and remote radio unit systems are also provided herein. Embodiments of the present invention will now be discussed in greater detail with reference to FIGS. 1-14B.

Figure 2:
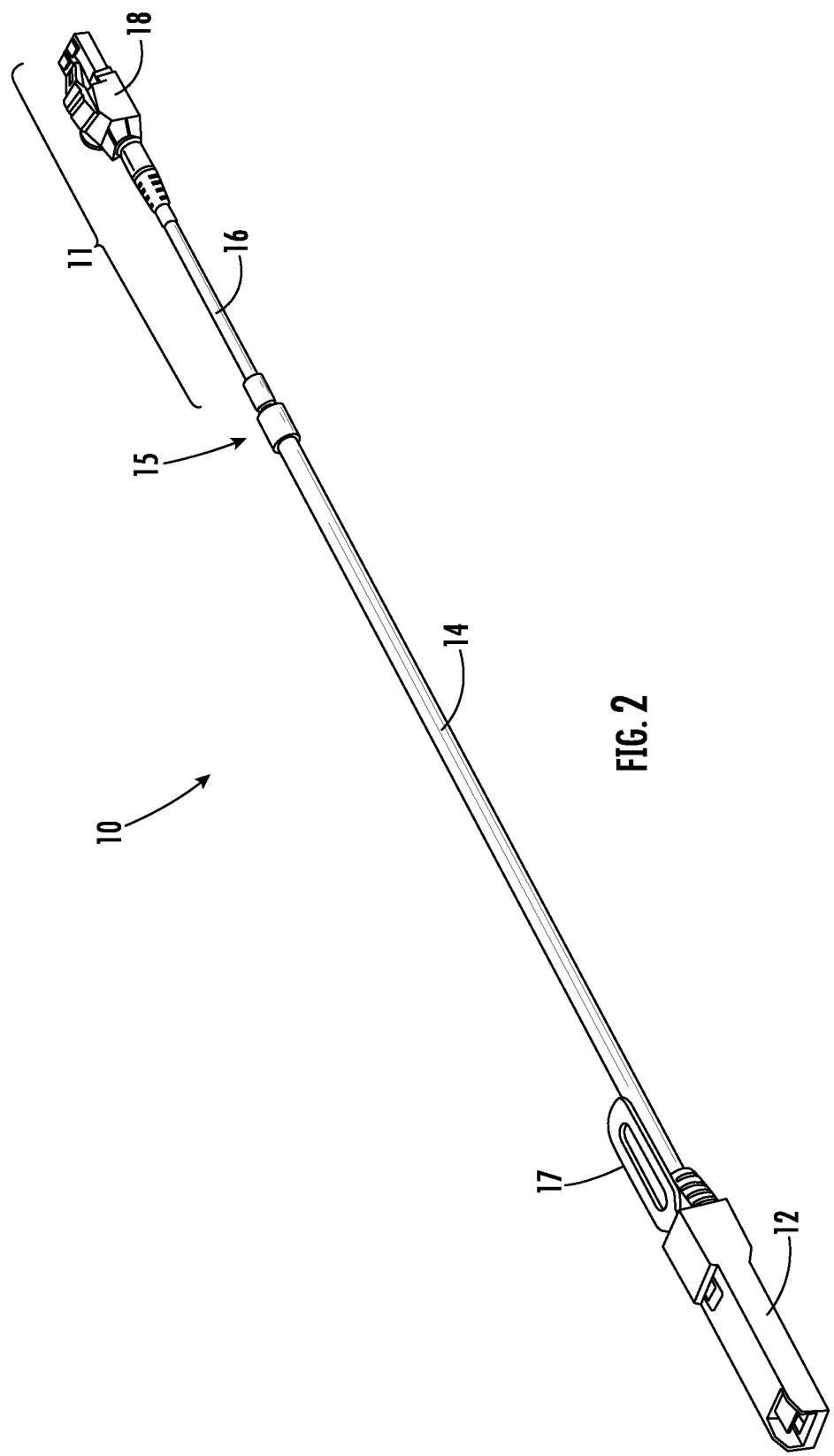
FIG. 2 is a perspective view of an active optical cable assembly according to embodiments of the present invention.

Referring now to the drawings, an active optical cable assembly 10 according to embodiments of the present is shown in FIGS. 1-2. As can be seen in FIGS. 1-2, the cable assembly 10 may include a fiber optic cable 14. In some embodiments, the fiber optic cable 14 may be a ruggedized fiber optic cable. At one end of the ruggedized fiber optic cable 14, a fixed active optical connector (with transceiver) 12 (e.g., an active optical connector) may be integrated with the cable 14. The fixed optical connector 12 is configured to be inserted into (i.e., plugged into) and received by an input port 32 of a remote radio unit 30 (see, e.g., FIGS. 5A-5B, FIGS. 6A-6B, and FIGS. 9A-9C). For example, in some embodiments, the fixed optical connector 12 may be a small form-factor pluggable (SFP) optical connector. As discussed above, the SFP converts an optical signal to an electrical signal. Integrating an SFP optical connector 12 into the optical assembly 10 of the present invention eliminates the optical connector interface issue described above. Thus, no special tools are required to test or clean the optical connectors, thereby helping to reduce installation time and costs associated therewith. In addition, because the non-integrated end of the SFP optical connector 12 is an electrical contact, the optical assembly 10 is easier to handle by a technician (i.e., not as delicate as an optical connector interface). Moreover, by eliminating the connector (optical assembly) to connector (SFP) optical connection, insertion loss (IL) and return loss (RL) may be improved, thereby increasing optical cleanliness. Furthermore, the active optical cable assembly 10 of the present invention (i.e., having an integrated SFP optical connector 12) can be tested prior to installation, thereby eliminating a technician discovering that an SFP is defective during RRU activation.

In some embodiments, the fixed optical connector 12 may have a pull tab 17 attached thereto. The pull tab 17 may be used by a technician to grip when removing (i.e., pulling) the fixed optical connector 12 from the input port 32 of the remote radio unit 30. In some embodiments, the pull tab 17 may also be used to help secure or lock the fixed connector 12 in place within the remote radio unit 30 (see, e.g., FIGS. 13A-13D).

The active optical cable assembly 10 of the present invention may further include a main cable assembly 11. In some embodiments, the main cable assembly 11 may comprise one or more fiber optic cables 16 with active optical connectors 18 (i.e., an optical cable assembly) (see also, e.g., FIGS. 11A-11B). In some embodiments, each fiber optic cable 14, 16 (i.e., the ruggedized fiber optic cable 14 and the one or more fiber optic cables 16 of the cable assembly 11) includes at least one optical fiber (not shown) that may be spliced together at a splice transition area (i.e., within a protective enclosure 15) (see, e.g., FIGS. 2, 3A-3B, 7A-7B, 10A-10B, and 11A-11B). In some embodiments, the optical fibers may be fusion spliced together. In some embodiments, the optical fibers may comprise ribbonized optical fibers 62 (see, e.g., FIGS. 11A-11B).

Figure 3A:
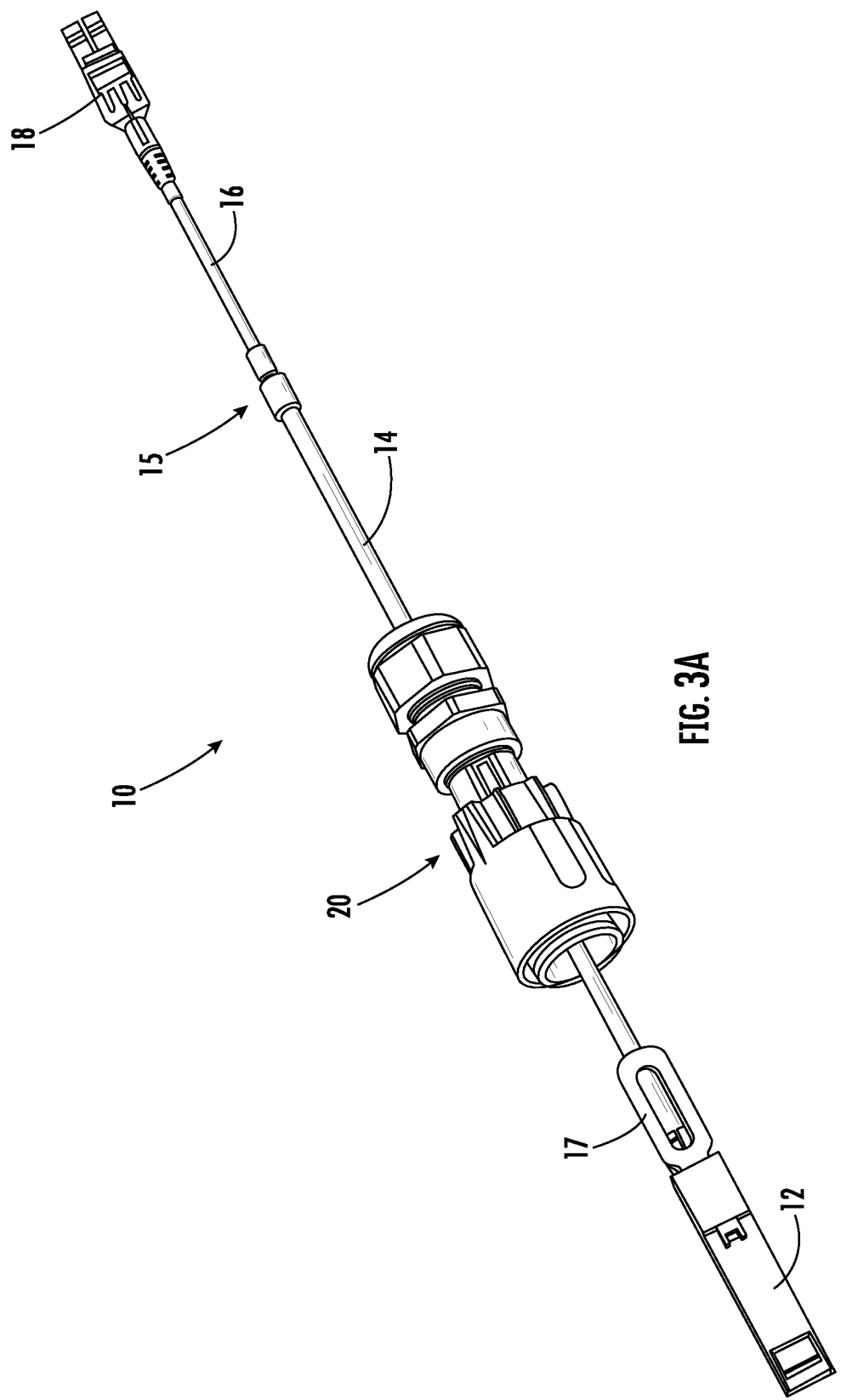
FIG. 3A is a perspective view of the active optical cable assembly of FIG. 1A with a removable shroud according to embodiments of the present invention.
Figure 3B:
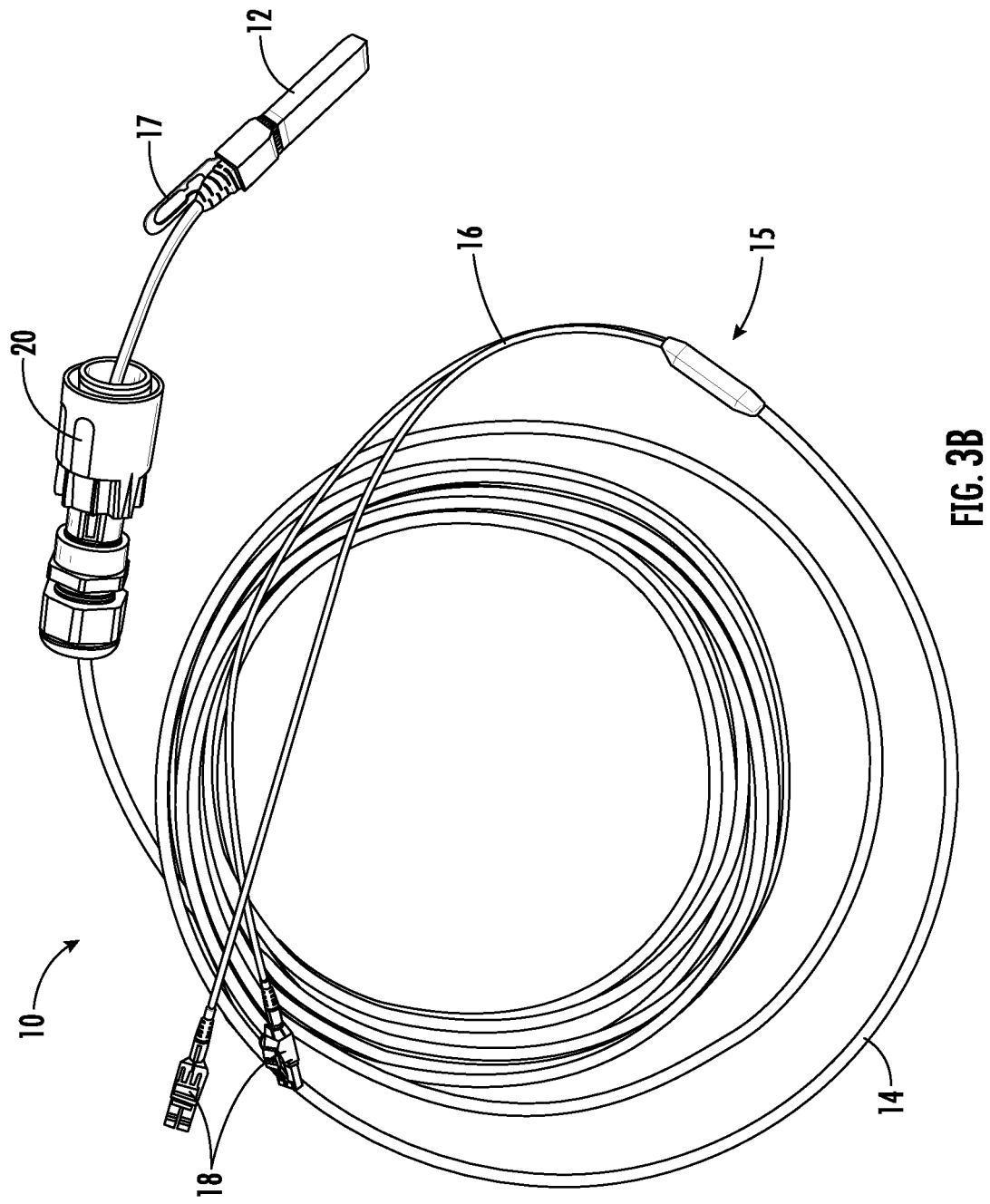
FIG. 3B is a photograph of an exemplary active optical cable assembly according to embodiments of the present invention.

As shown in FIGS. 3A-3B, in some embodiments, the active optical cable assembly 10 may further include a removable shroud 20. The shroud 20 is configured to surround at least a portion of the fixed optical connector 12. For example, the shroud 20 may surround a portion of the fixed optical connector 12 that extends outwardly from the remote radio unit 30 when the fixed connector 12 is plugged into the remote radio unit 30 (see, e.g., FIG. 6B).

Figure 4A:
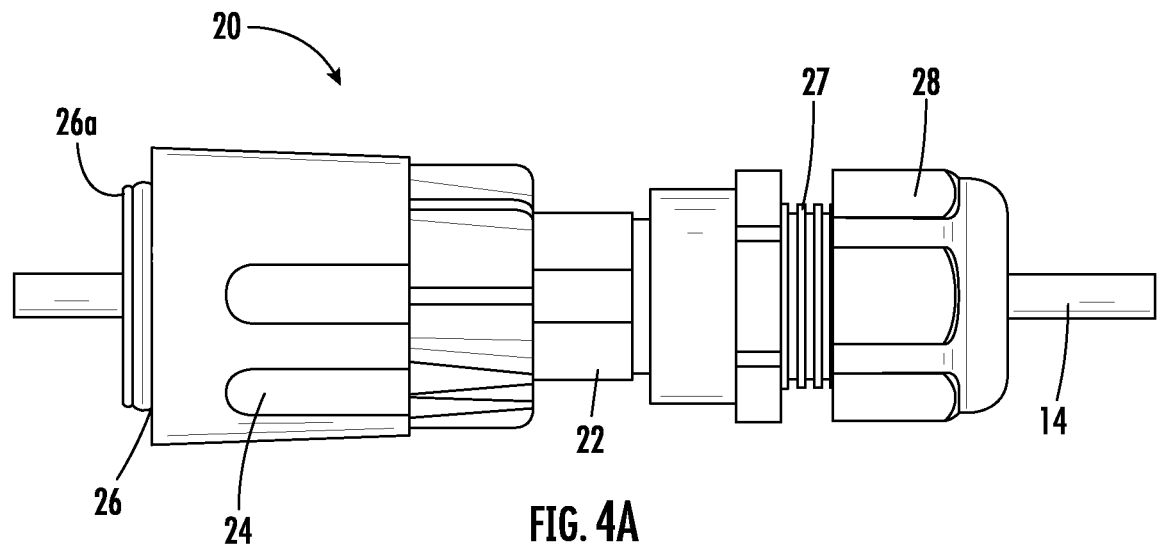
FIG. 4A is a side view of a removable shroud according to embodiments of the present invention.
Figure 4B:
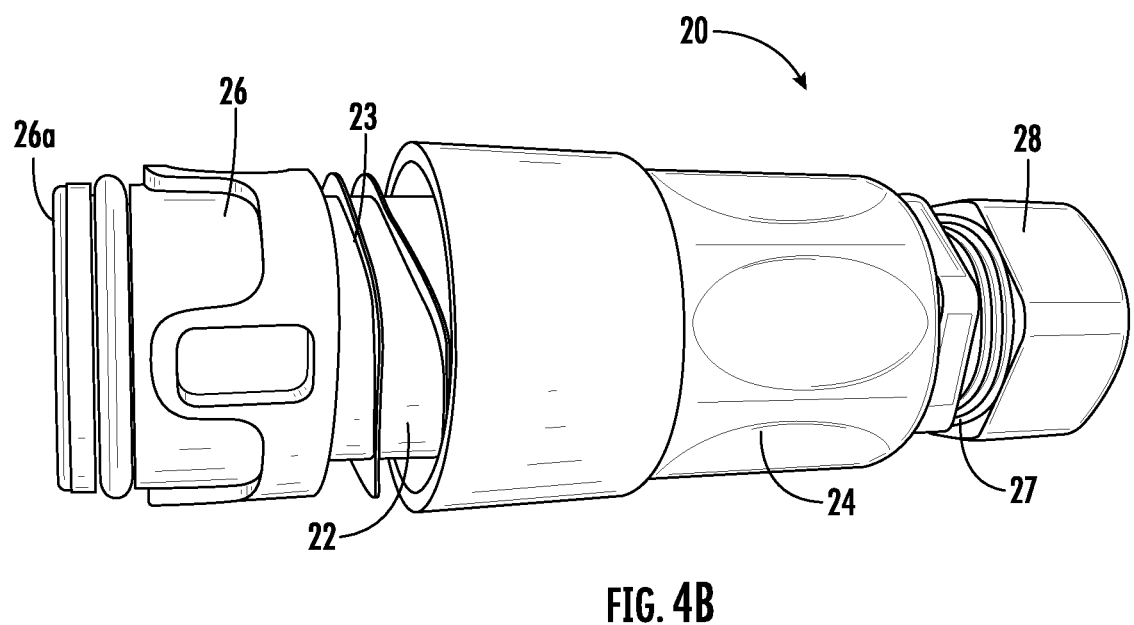
FIG. 4B is a photograph of an exemplary removable shroud according to embodiments of the present invention.
Figure 4C:
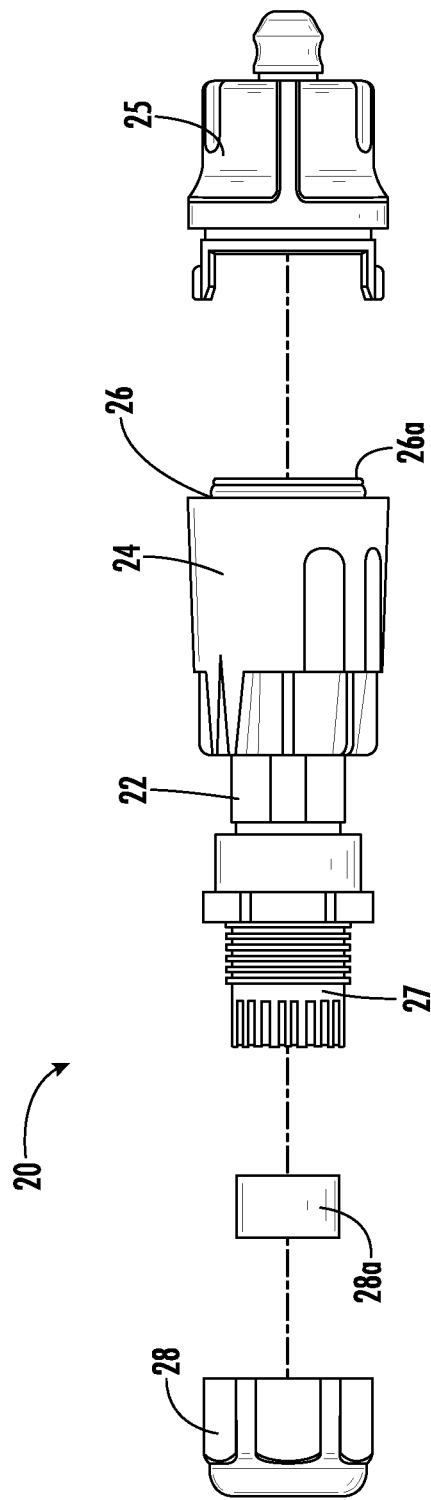
FIG. 4C is an exploded view of the removable shroud of FIG. 4A.

The removable shroud 20 is further shown in FIGS. 4A-4C. As illustrated in FIGS. 4A-4C, the shroud 20 includes a tubular main body 22. At one end, the main body 22 comprises a locking section 26 with a mating end 26a. A threaded section 27 resides at the opposing end of the main body 22. The removable shroud 20 further includes a locking mechanism 24 that is slidable along the main body 22. A biasing member 23 (e.g., a spring) is coupled to the main body 22 of the shroud 20 and resides between the locking section 26 and the locking mechanism 24. As described in further detail below, the locking mechanism 24, locking section 26, and biasing member 23 may function together as a "push-pull" latching mechanism to secure the shroud 20 to a remote radio unit 30. In some embodiments, the shroud 20 also includes a coupling nut 28 and coupling gasket 28a. The coupling nut 28 is configured to be screwed onto the threaded section 27 of the main body 22. In some embodiments, the shroud 20 may further comprise a sealed end cap 25.

Figure 5A:
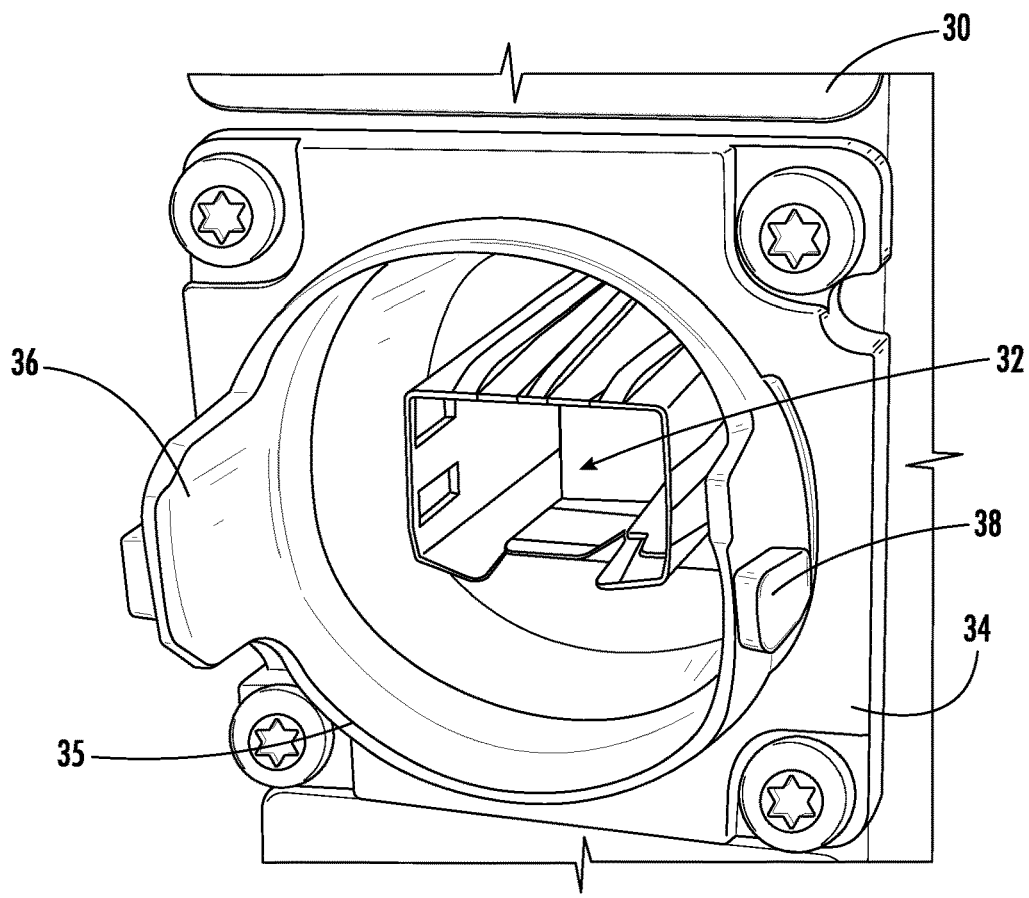
FIG. 5A is a photograph of an input port to a remote radio unit and mating interface for a removable shroud according to embodiments of the present invention.
Figure 5B:
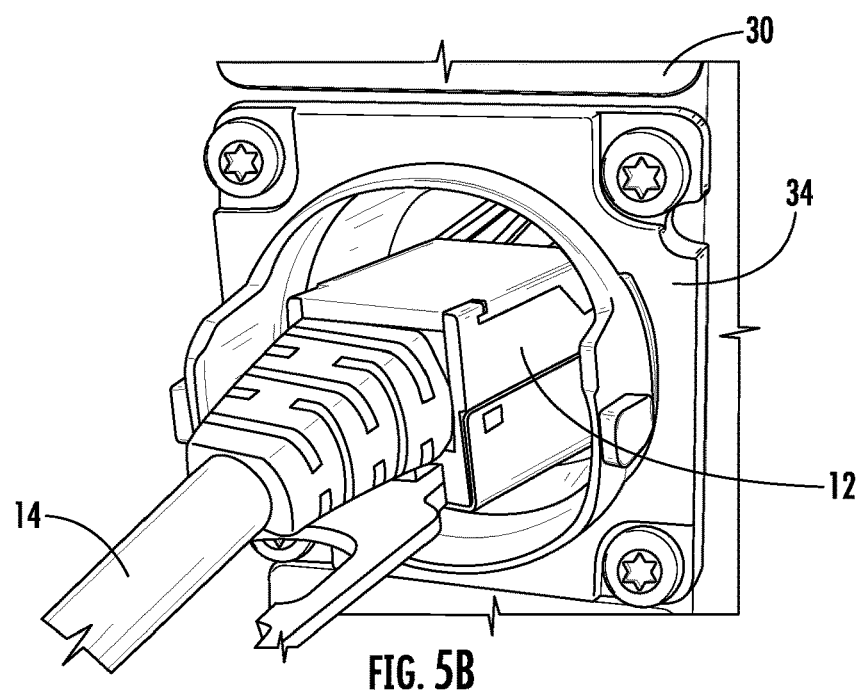
FIG. 5B is a photograph of the input port of FIG. 5A with the fixed active optical connector of FIG. 1 plugged into the input port.
Figure 6A:
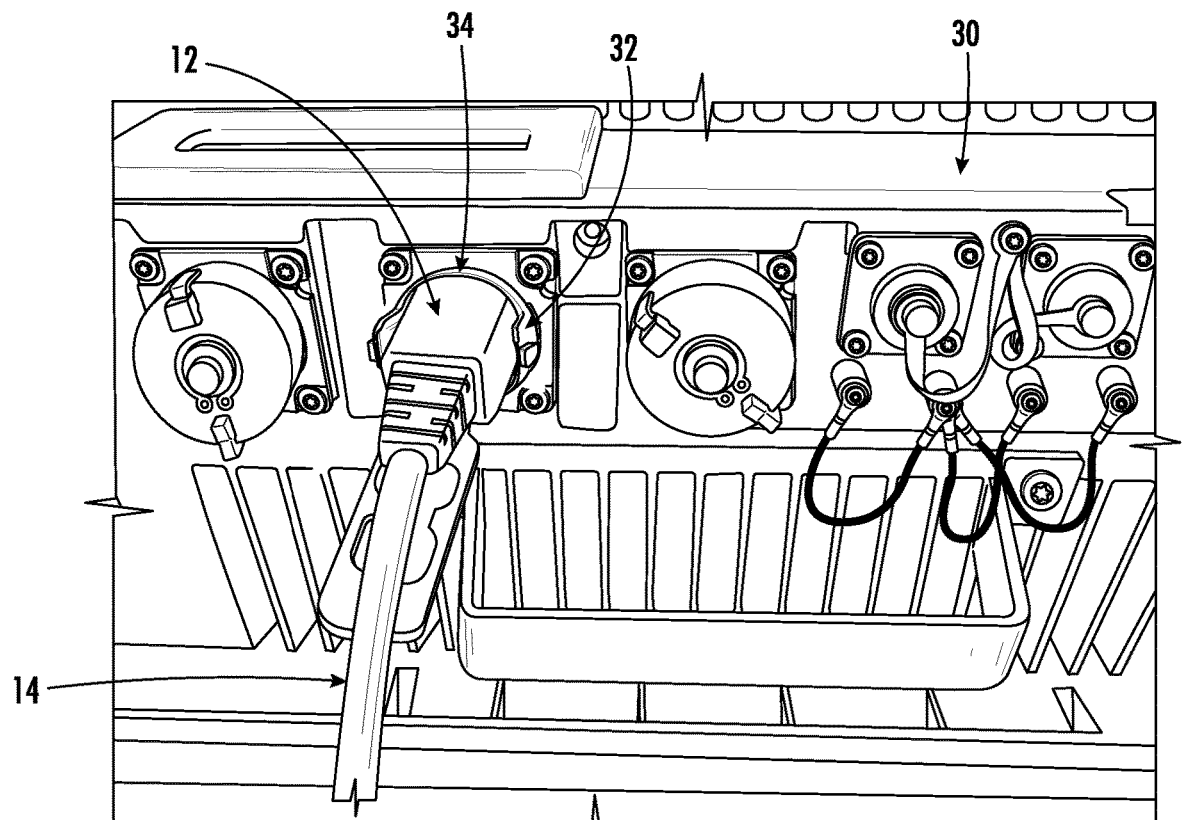
FIG. 6A is a photograph of an exemplary active optical cable assembly connected to a remote radio unit according to embodiments of the present invention, wherein the shroud of the assembly is omitted.
Figure 6B:
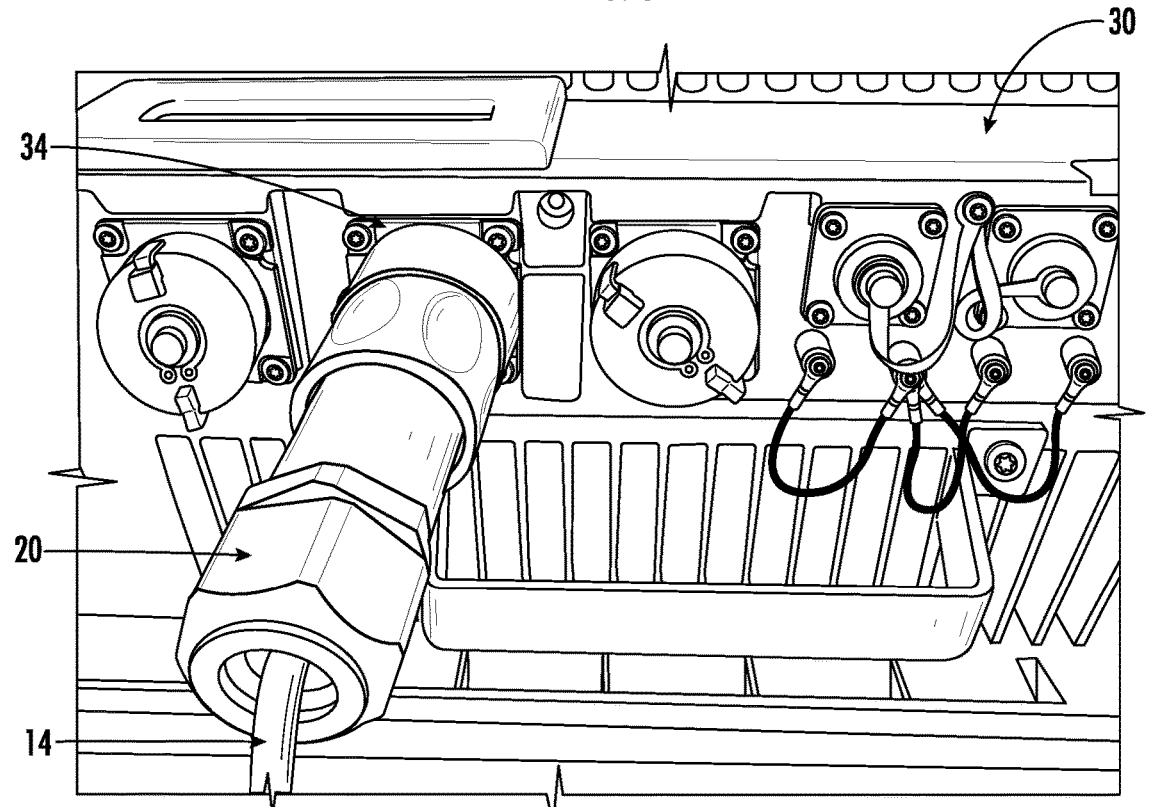
FIG. 6B is a photograph of the active optical cable assembly shown in FIG. 6A with a removable shroud according to embodiments of the present invention.
Figure 7A:
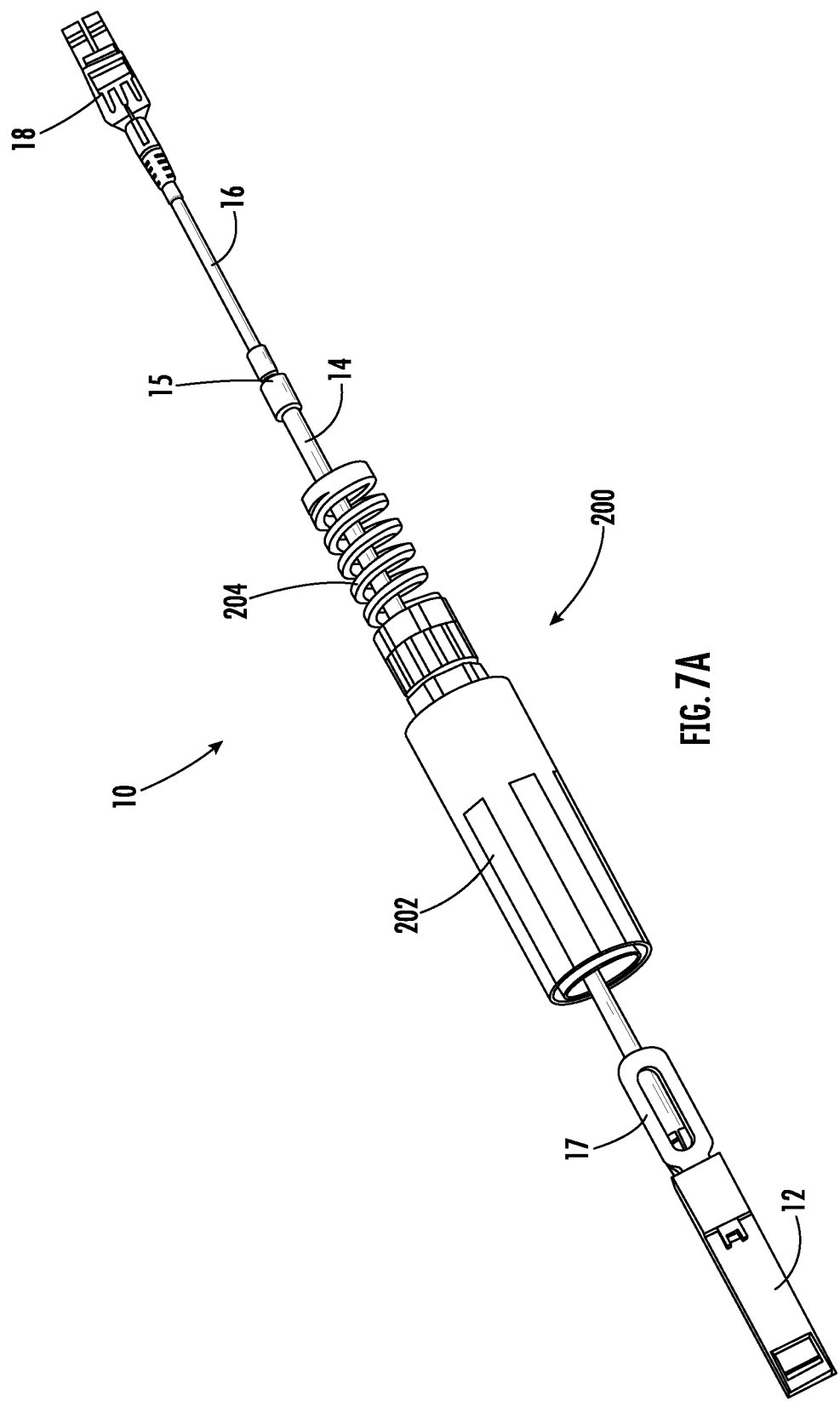
FIG. 7A is a perspective view of the active optical cable assembly of FIG. 2 with an alternative removable shroud according to embodiments of the present invention.
Figure 7B:
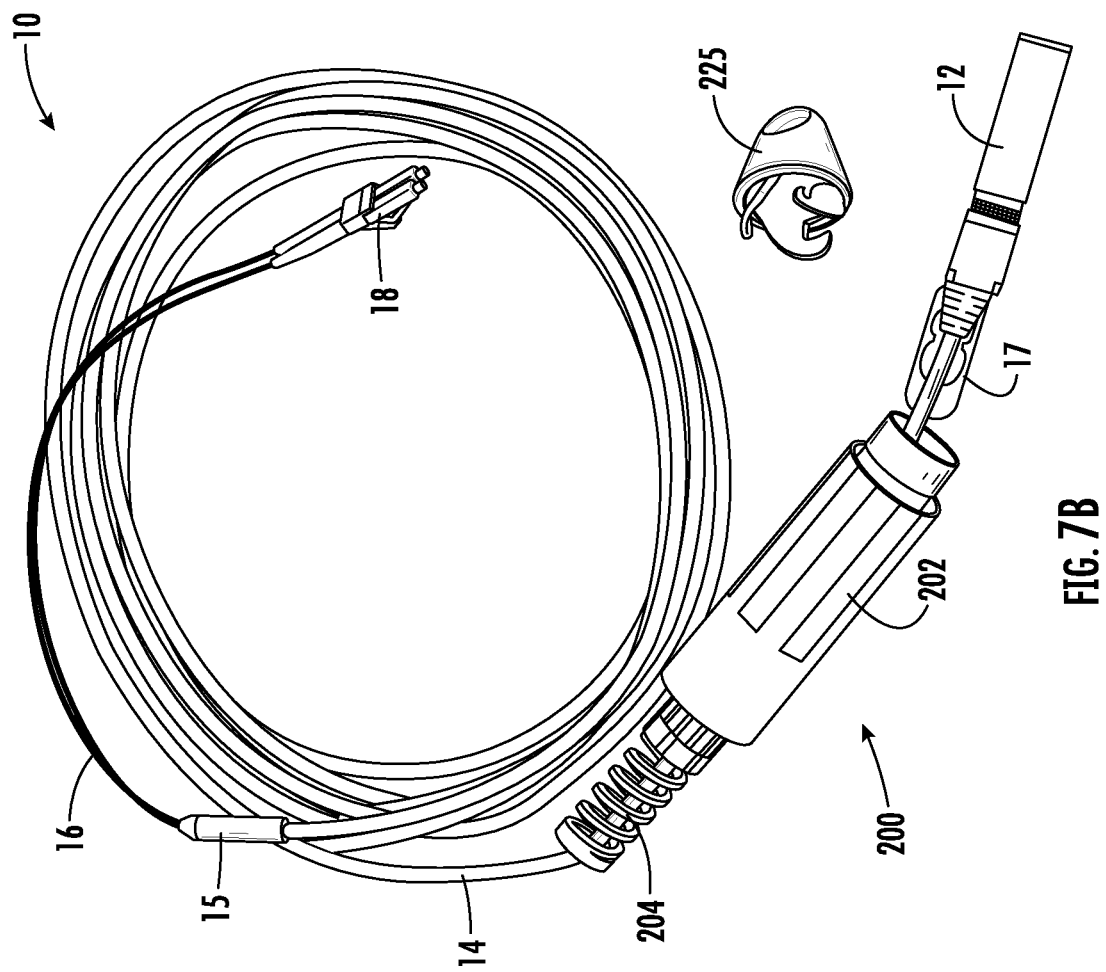
FIG. 7B is a photograph of an exemplary active optical cable assembly according to embodiments of the present invention.
Figure 8A:
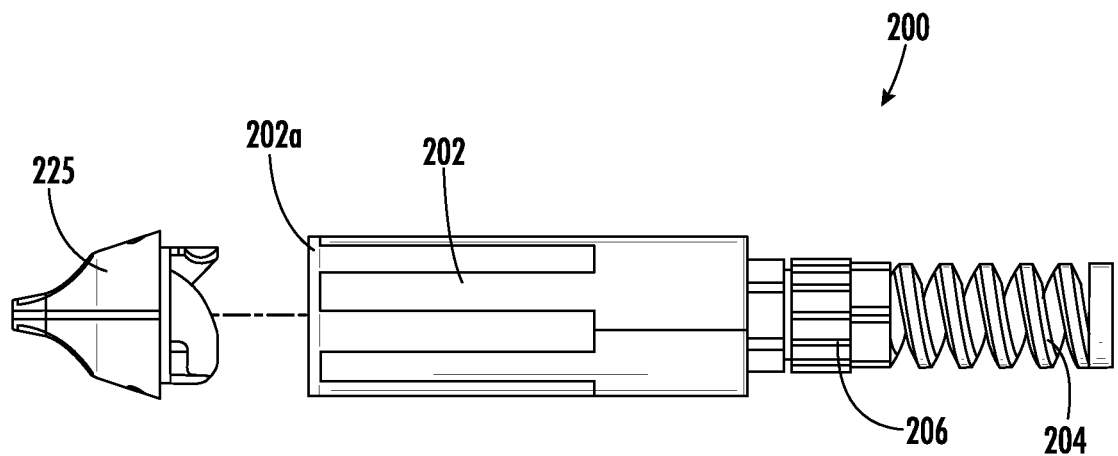
FIG. 8A is a side view of a removable shroud according to embodiments of the present invention.
Figure 8B:
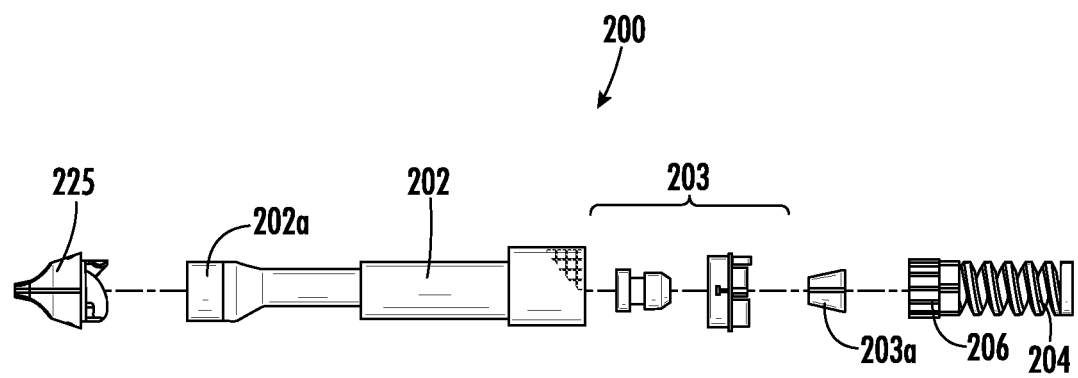
FIG. 8B is a photograph of an exemplary removable shroud according to embodiments of the present invention.

The locking section 26 (and mating end 26a) of the removable shroud 20 may be configured to secure the shroud 20 to the remote radio unit 30 (i.e., after a fixed active optical connector 12 has been plugged into an input port 32). In some embodiments, the shroud 20 may be configured to be secured to a mating interface 34 corresponding to an input port 32 of the remote radio unit 30 (see, e.g., FIG. 6B). For example, in some embodiments, the shroud 20 may form a bayonet connection with the mating interface 34. As shown in FIGS. 5A-5B, the mating interface 34 may comprise an annular flange 35. In some embodiments, a pair of arms 36 may extend outwardly from the annular flange 35. Each arm may comprise a securing feature 38, such as, a snap-fit feature or the like. In some embodiments, to secure the shroud 20 to the remote radio unit 30, the mating end 26a is aligned with the mating interface 34 such that the locking section 26 is located inside the annular flange 35 and between the outwardly extending arms 36. Next, the locking mechanism 24 is pushed (or slid) along the main body 22 toward the locking section 26 (compressing the biasing member 23) until the locking mechanism 24 engages the securing feature 38 of the arms 36 (i.e., the arms 36 are between the locking section 26 and the locking mechanism 24). The locking mechanism 24 is then rotated to lock the securing feature 38 within the locking mechanism 24, thereby securing the shroud 20 to the remote radio unit 30. Once the shroud 20 is secured to the remote radio unit 30, the coupling nut 28 may be screwed onto the threaded section 27 of the main body 22. As the coupling nut 28 is tightened, the coupling gasket 28a is squeezed against the ruggedized cable 14, thereby creating a seal between the removable shroud 20 and the cable 14.

To remove the shroud 20 from the remote radio unit 30, the coupling nut 28 is unscrewed from the threaded section 27 and the locking mechanism 24 is rotated in an opposite direction to release the securing feature 38 from the locking mechanism 24. Once released, the biasing member 23 pushes the locking mechanism 24 away from the locking section 26, thereby allowing the shroud 20 to be pulled away from the mating interface 34 of the remote radio unit 30.

In some embodiments, the mating end 26a of the shroud 20 may be configured to form an interference fit (e.g., via gasket compression) with the mating interface 34 of the remote radio unit 30. In other embodiments, the shroud 20 may comprise threads that correspond to threads on the mating interface 34, allowing the shroud 20 to be secured (i.e., screwed) onto the remote radio unit 30. The shroud 20 may help to enhance or increase optical cleanliness by providing protection to the optical connection between the fixed optical connector 12 and the remote radio unit 30 (e.g., protecting from dust and/or environmental conditions). In addition, in some embodiments, the shroud 20 may comprise one or more features configured to protect the fixed optical connector 12 from vibration and/or mechanical shock. For example, in some embodiments, the shroud 20 may be molded such that the interior of the shroud 20 corresponds to the shape of the fixed connector 12 which helps to hold the fixed connector 12 in place. In some embodiments, the vibration reduction and/or alignment feature may be a gasket or slotted spring feature. In some embodiments, the removable shroud 20 may be formed from a polymeric material, such as polyurethane, rubber, acrylonitrile butadiene styrene (ABS), or the like.

Referring to FIGS. 7A-7B and FIGS. 8A-8B, according to embodiments of the present invention, an alternative removable shroud 200 that may be used with the active optical cable assembly 10 is illustrated. As shown in FIGS. 7A-8B and FIGS. 8A-8B, in some embodiments, at least a portion of the shroud 200 may be formed from a metallic material. The metallic portion 202 of the shroud 200 may be configured to surround at least a portion of the fixed optical connector 12 and be secured to the remote radio unit 30 (e.g., by mating end 202a). In some embodiments, the shroud 200 may further comprise a polymeric strain relief section 204. The polymer strain relief section 204 may be configured to bend with the fiber optic cable 14, thereby relieving strain from the removable shroud 200 and fixed optical connector 12 within the shroud 200. The strain relief section 204 of the shroud 200 may further comprise a coupling nut 206 configured to threaded with the metallic portion 202. Similar to the shroud 20 described above, as the coupling nut 206 is threaded with the metallic portion 202, a coupling mechanism 203 squeezes a coupling gasket 203a against the ruggedized cable 14, thereby creating a seal between the shroud 200 and the cable 14.

Figure 9A:
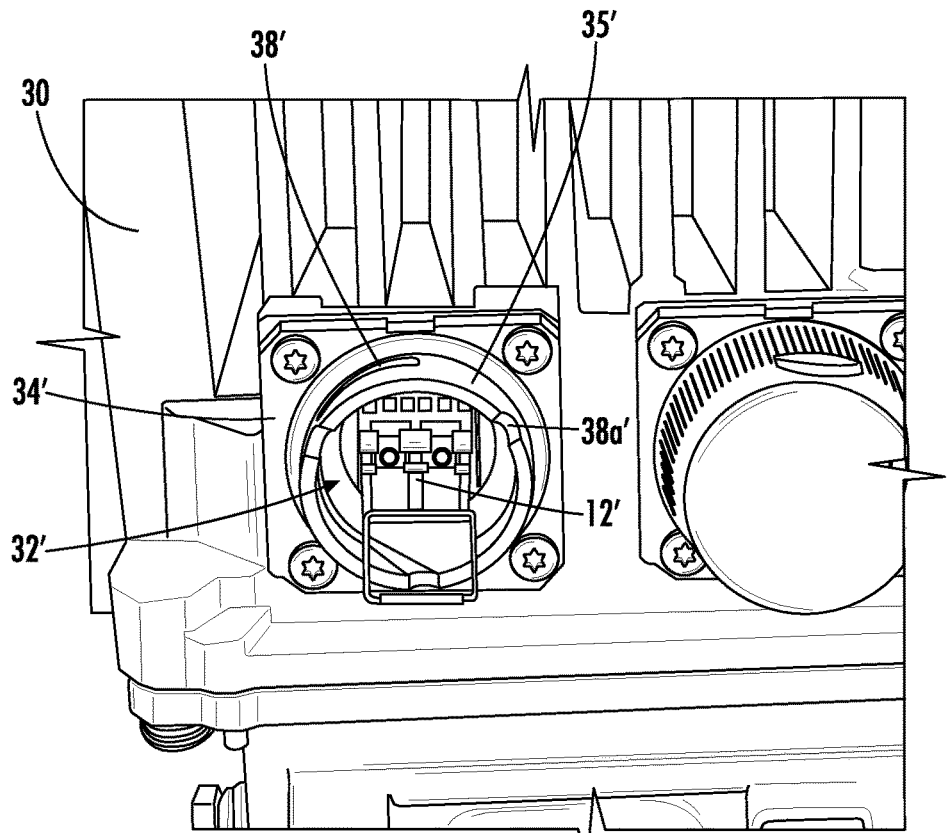
FIG. 9A is a photograph of an input port to a remote radio unit, with a standard SFP plugged into the input port, and a mating interface for a removable shroud according to embodiments of the present invention.
Figure 9B:
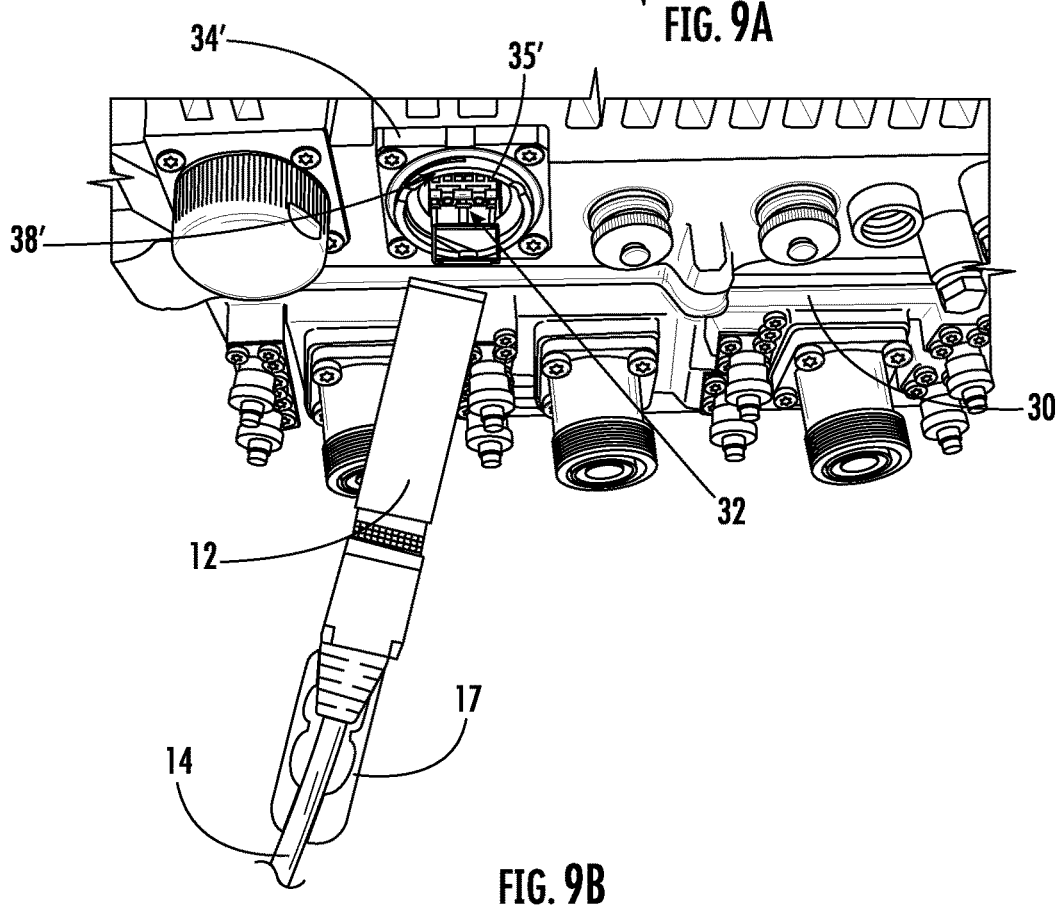
FIG. 9B is a photograph of the input port and mating interface of FIG. 9A with a standard fixed active optical connector of FIG. 1 prior to being plugged into the input port.
Figure 9C:
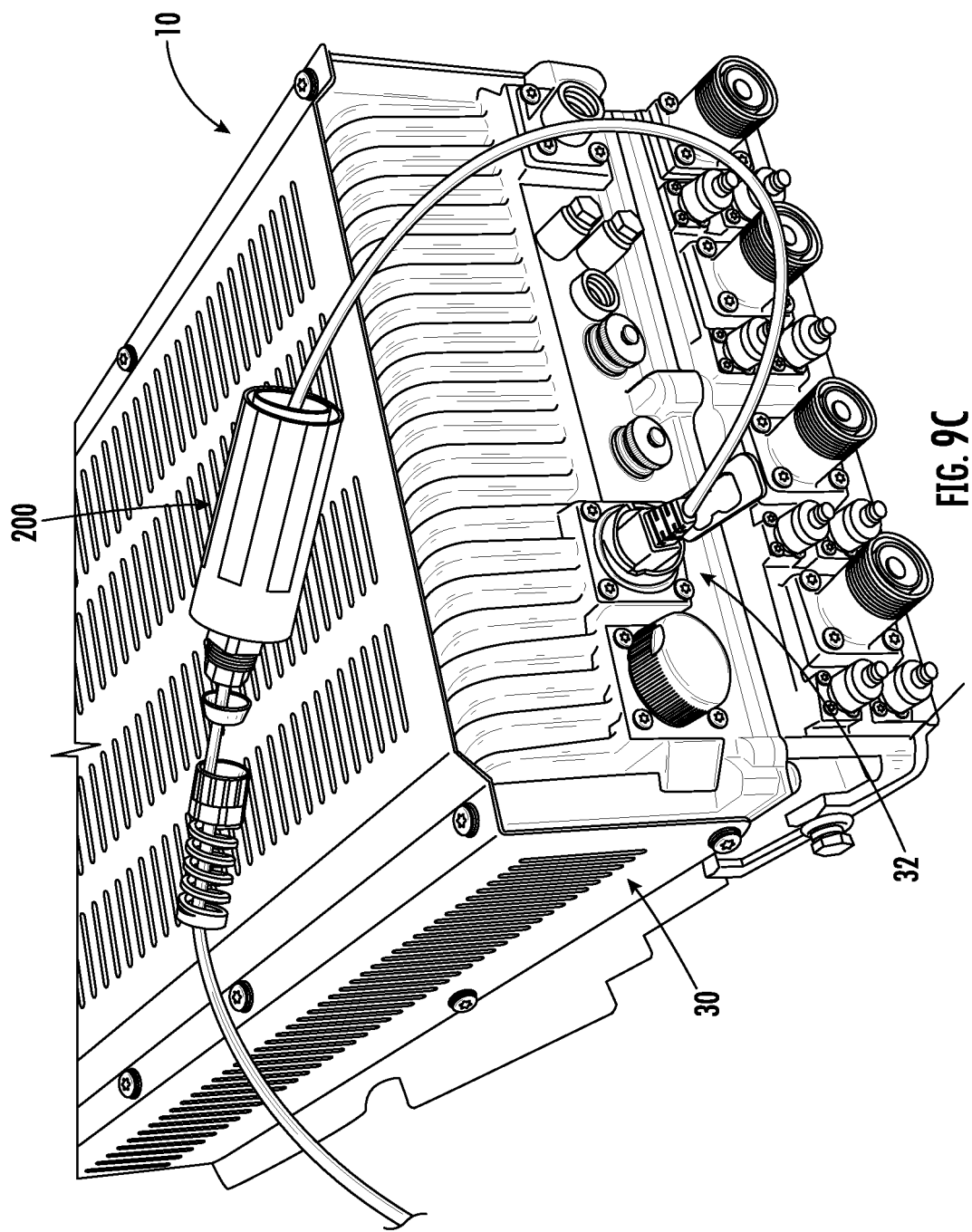
FIG. 9C is a photograph of the active optical cable assembly of FIG. 7B with the fixed active optical connector plugged into the input port of the remote radio unit.

FIGS. 9A-9C illustrate a remote radio unit 30 having a different mating interface 34'. As shown in FIGS. 9A-9B, instead of a pair of arms 36 with a securing feature 38, in some embodiments, the mating interface 34' may have an extended annular flange 35'. The extended annular flange 35' may comprise one or more slots 38', each having an open end 38a'. In some embodiments, to secure the shroud 200 to a remote radio unit 30 having mating interface 34', the mating end 202a of the metallic portion 202 is aligned with the extended annular flange 35' such that corresponding securing features (not shown) within the mating end 202a align with each open end 38a' of the slots 38'. The metallic portion 202 is rotated to lock each securing feature within a respective slot 38', thereby securing the removable shroud 200 to the remote radio unit 30.

To remove the shroud 200 from the remote radio unit 30, the coupling nut 206 is unscrewed from the metallic portion 202 and the metallic portion 202 is rotated in an opposite direction to release the securing features from the slots 38'. Once released, the shroud 200 may be pulled away from the mating interface 34' of the remote radio unit 30.

Similar to the removable shroud 20 described above, the removable shroud 200 may help to enhance or increase optical cleanliness by helping to protect the optical connection between the fixed optical connector 12 and the remote radio unit 30. In some embodiments, the shroud 200 may be configured to form an interference fit with the mating interface 34 of the remote radio unit 30. In other embodiments, the shroud 200 may comprise threads that correspond to threads on the mating interface 34, thereby allowing the shroud 200 to be secured (i.e., screwed) onto the remote radio unit 30. In addition, in some embodiments, the shroud 200 may comprise one or more features configured to protect the fixed optical connector 12 from vibration and/or mechanical shock. The removable shrouds 20, 200 also provide protection against environmental conditions such as rain, snow, etc.

Figure 11A:
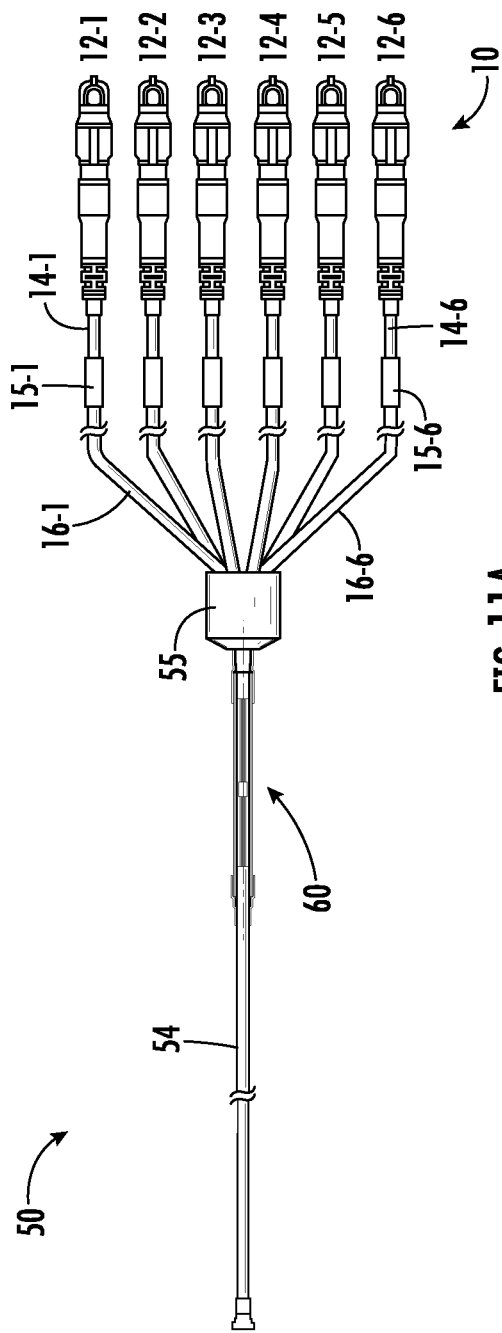
FIG. 11A is a side view of a fiber optic cable assembly according to embodiments of the present invention.
Figure 11B:
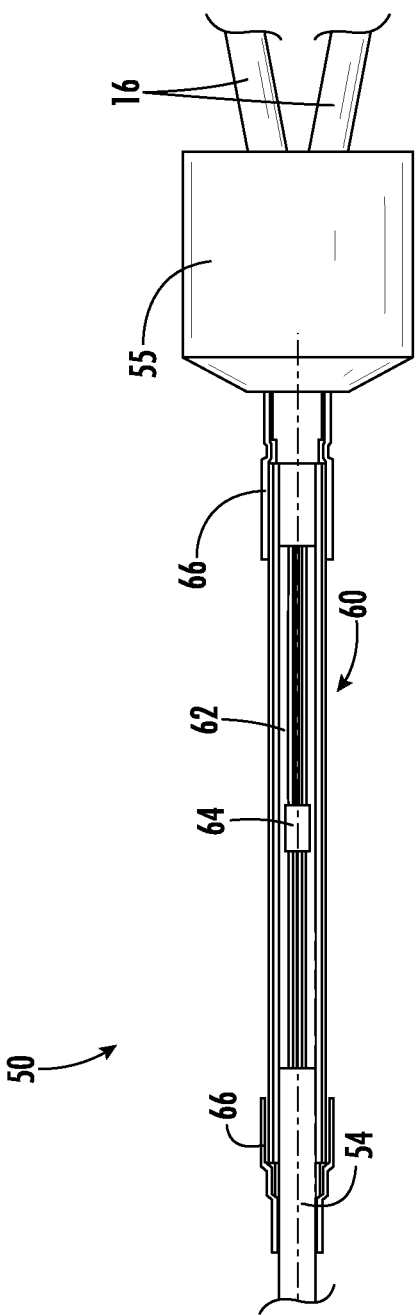
FIG. 11B is an enlarged partial view of the fiber optic cable assembly of FIG. 11A.

Referring now to FIGS. 10A-10B and FIGS. 11A-11B, in some embodiments, the main cable assembly 11 may be a hybrid cable assembly 40 (FIGS. 10A-10B) or fiber optic cable assembly 50 (FIGS. 11A-11B). As shown in FIGS. 10A-10B, the hybrid cable assembly 40 includes a hybrid cable 44 that may comprise optical cables (i.e., optical fibers) 16 with optical connectors 18 and power conductors (e.g., copper conductors) 42. The hybrid cable assembly 40 may include one or more transition or breakout sections (i.e., protective enclosures) 45 allowing the hybrid cable assembly 40 to breakout into two or more active optical cable assemblies 10. For example, as shown in FIGS. 10A-10B, the hybrid cable assembly 40 may be broken out into two active optical cable assemblies 10 with a central power cable 46. As discussed herein, in some embodiments, the fiber optic cables 14, 16 include at least one optical fiber (not shown) that may be spliced together at a splice transition area (i.e., within the protective enclosures 15, 45). In some embodiments, the optical fibers may be fusion spliced together.

As shown in FIGS. 11A-11B, the fiber optic cable assembly 50 includes a fiber optic cable 54 that may comprise ribbonized optical fibers 62. The fiber optic cable assembly 50 may include a transition or breakout section 55 allowing the fiber optic cable assembly 50 to breakout into two or more active optical cable assemblies 10 (with respective fixed optical connectors 12). The fiber optic cable assembly 50 may include any number of active optical cable assemblies 10. For example, as shown in FIG. 11A, the fiber optic cable assembly 50 may include six active optical cable assemblies 10 with fixed optical connectors 12 (i.e., 12-1 through 12-6). As shown in FIG. 11B, in some embodiments, the optical fibers 62 may be spliced together at a splice transition area 64. In some embodiments, the optical fibers 62 may be fusion spliced together. In some embodiments, the splice transition area 64 (e.g., fusion spliced) may be encapsulated by a protective enclosure 60, such as an armored furcation tube. The protective enclosure 60 may be secured to the fiber optic cable 54 via an adhesive heat-shrink tube or over-molded polymer 66.

Figure 12A:
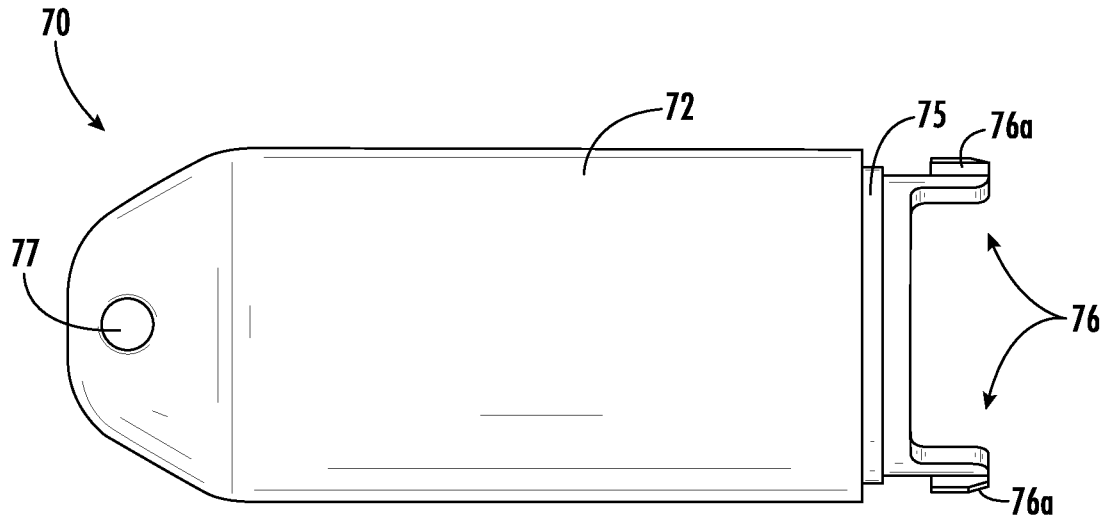
FIG. 12A is a side view of an end cap for an active optical connector according to embodiments of the present invention.
Figure 12B:
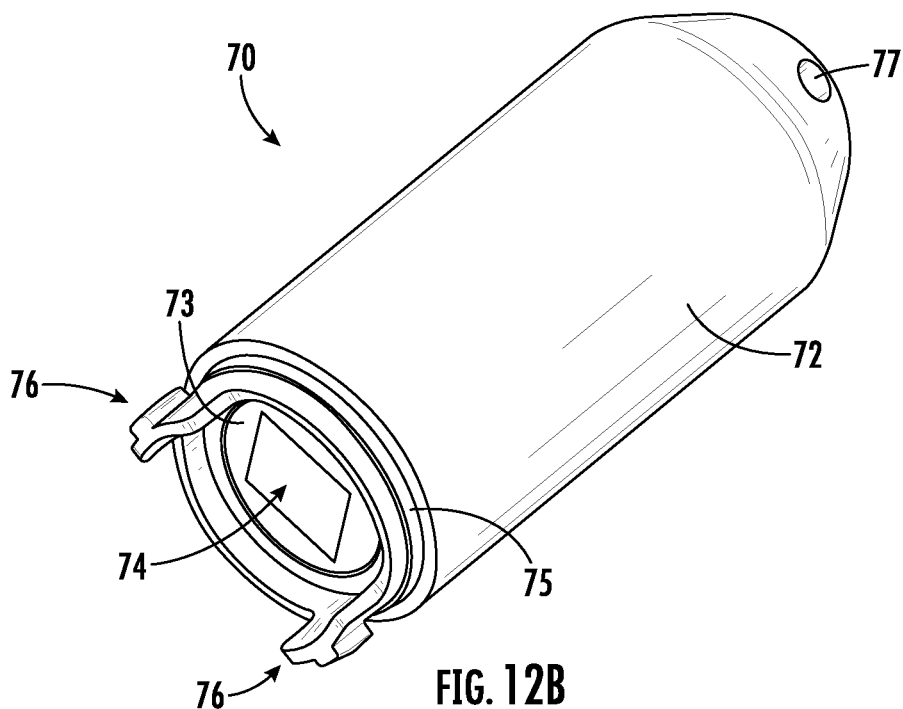
FIG. 12B is a perspective view of the end cap of FIG. 12A.
Figure 12C:
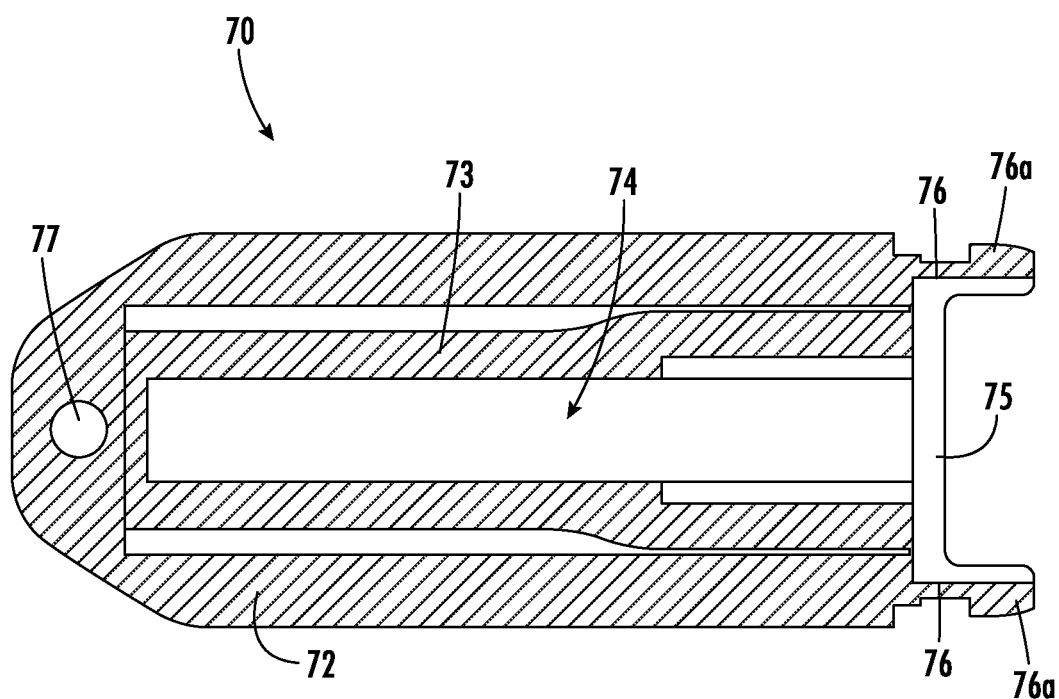
FIG. 12C is a side cross-sectional view of the end cap of FIGS. 12A-12B.

Referring now to FIGS. 12A-12C, an end cap 70 for the active optical cable assembly 10 of the present invention is illustrated. The end cap 70 is configured to fit around the fixed active optical connector 12 and protect the connector 12 (and transceiver) during, for example, shipment and/or storage (e.g., from dust and/or environmental conditions) before the connector 12 is plugged into a remote radio unit 30. The end cap 70 comprises an outer protective shell 72 surrounding an inner cavity 74 with an open end. The open end is configured to allowed the end cap 70 be slid onto the fixed optical connector 12. In some embodiments, the inner cavity 74 is configured to form an interference fit with the fixed optical connector 12. For example, as shown in FIGS. 12B-12C, an interior gasket 73 may be molded such that the inner cavity 74 corresponds with the shape of the fixed connector 12 (e.g., rectangular in shape), allowing the end cap 70 to form an interference fit with the active optical connector 12, and thereby helping to reduce vibration and/or mechanical shock on the optical connector 12.

As shown in FIGS. 12A-12C, in some embodiments, the end cap 70 may have one or more additional securing features 76. The securing features 76 may extend outwardly in an axial direction from the open end of the end cap 70. The securing features 76 may be configured to secure the end cap 70 to the removable shroud 20, 200 described herein. Any number of known securing features 76 may be used with the end cap 70. For example, in some embodiments, the securing feature 76 may be a snap-fit feature that can be deflected radially inward until a protrusion 76a, for example, engages with a corresponding feature of the removable shroud 20, 200.

In some embodiments, the end cap 70 may further comprise an annular gasket 75 adjacent to the open end. The annular gasket 75 may help to provide a water-tight seal, for example, between the end cap 70 and the removable shroud 20, 200. In some embodiments, the end cap 70 may further include an aperture 77. The aperture 77 may be used during storage and/or may be used to help remove the end cap 70 from a fixed optical connector 12.

Figure 13A:
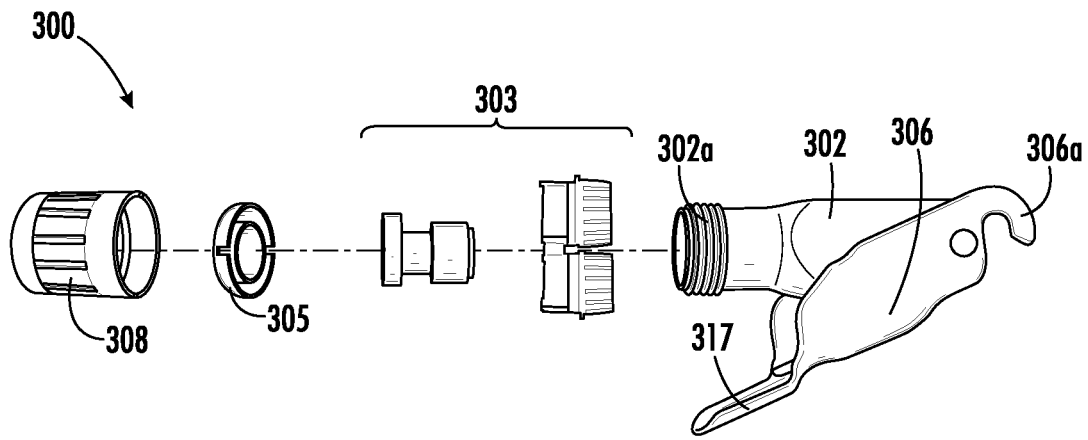
FIG. 13A is a photograph of an exemplary alternative removable shroud (exploded) according to embodiments of the present invention.
Figure 13B:
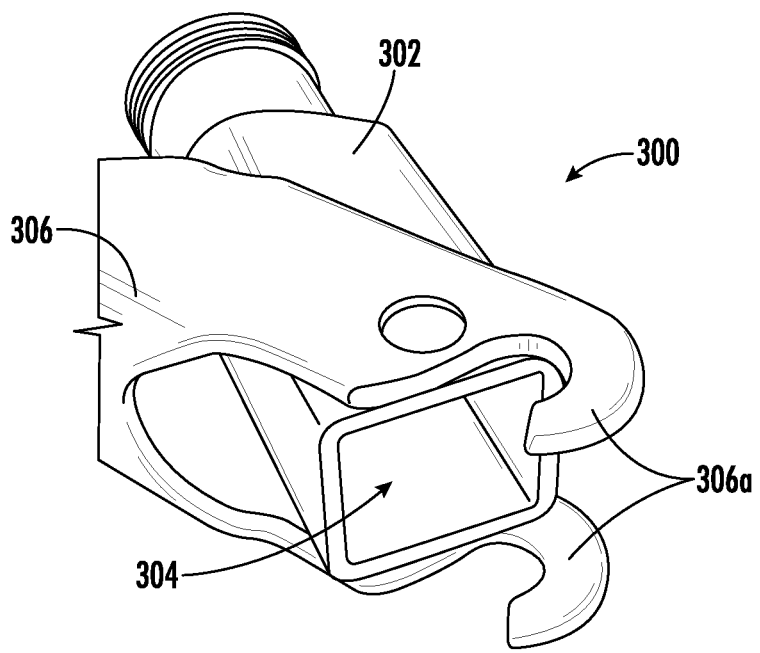
FIG. 13B is an enlarged photograph of the main body of the removable shroud of FIG. 13A.
Figure 13C:
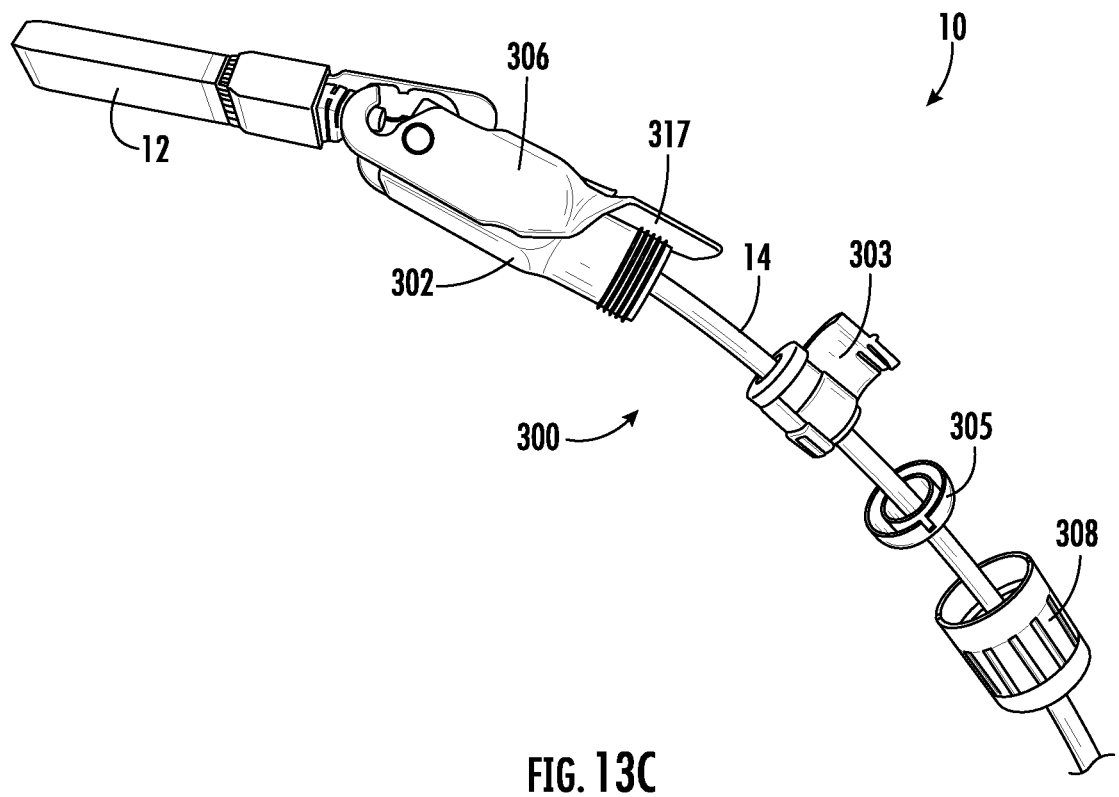
FIG. 13C is a photograph of an exemplary active optical cable assembly with the removable shroud of FIG. 13A according to embodiments of the present invention.

Referring now to FIGS. 13A-13D, an alternative removable shroud 300 according to embodiments of the present invention is illustrated. As shown in FIGS. 13A-13C, in some embodiments, the shroud 300 has a main body 302. The main body 302 has an inner cavity 304 configured to fit at least a portion of an active optical connector 12, 12' (see, e.g., FIG. 13B). In some embodiments, the inner cavity 304 is configured to form an interference fit with at least a portion of an active optical connector 12, 12'. The shroud 300 further has a latching mechanism 306 that is pivotably coupled to the main body 302. At one end of the latching mechanism 306 is a latch (or hook) 306a configured to secure the shroud 300 to a remote radio unit 30. At the other end of the latching mechanism is a pull tab 317. To secure the shroud 300 to a remote radio unit 30, the main body 302 is slid over the active optical connector 12, 12' (i.e., already plugged into the input port 32, 32' of the remote radio unit 30) and the pull tab 317 is pushed toward the main body 302 which pivots the latch 306 to lock with a corresponding securing feature (not shown) on the remote radio unit 30, thereby securing the shroud 300 to the remote radio unit 30.

Figure 13D:
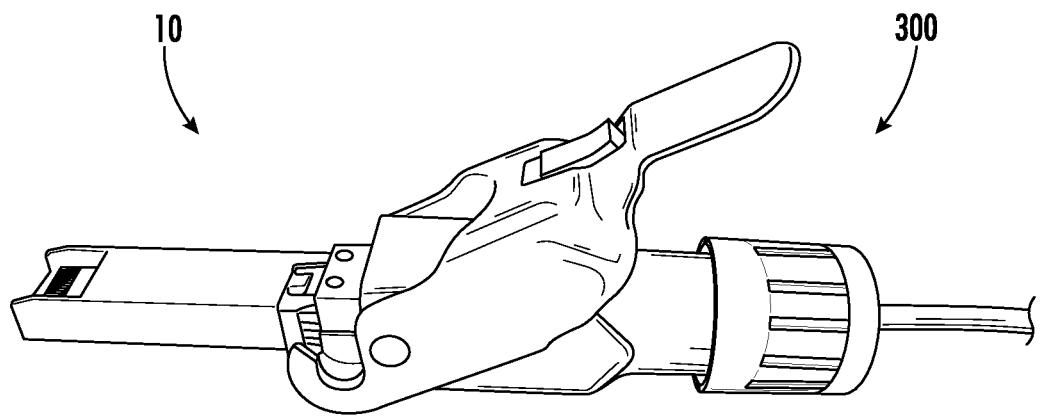
FIG. 13D is a photograph of the active optical cable assembly of FIG. 13C.

The shroud 300 further includes a coupling nut 308 configured to be threaded with a threaded section 302a of the main body 302. Similar to the shrouds 20, 200 described herein, as the coupling nut 308 is threaded with the threaded section 302a, a coupling mechanism 303 squeezes a coupling gasket 305 against the ruggedized cable 14, thereby creating a seal between the shroud 300 and the cable 14. FIG. 13D shows the removable shroud 300 in combination with an active optical cable assembly 10 of the present invention.

Figure 14A:
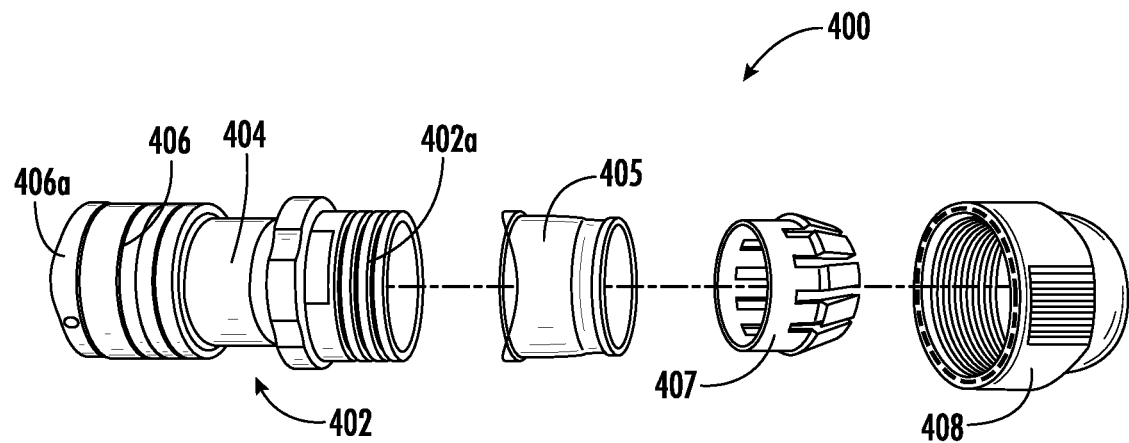
FIG. 14A is a photograph of an exemplary alternative removable shroud (exploded) according to embodiments of the present invention.
Figure 14B:
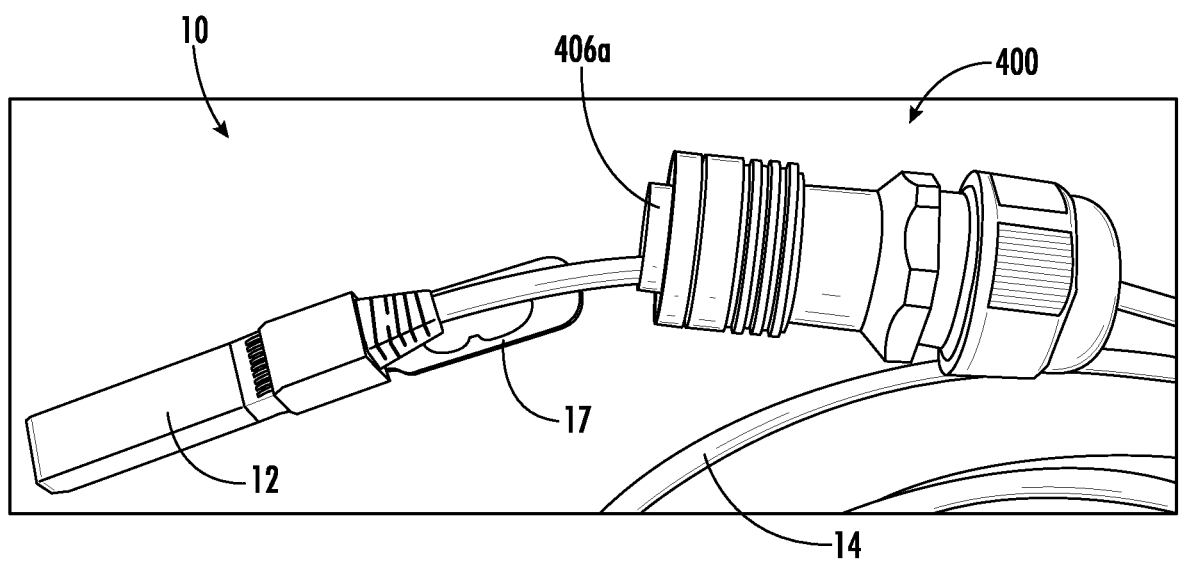
FIG. 14B is a photograph of an exemplary active optical cable assembly with the removable shroud of FIG. 14A according to embodiments of the present invention.

Referring now to FIGS. 14A-14B, an alternative removable shroud 400 according to embodiments of the present invention is illustrated. Removable shroud 400 is similar to removable shroud 20 described herein. Thus, properties and/or features of the shroud 400 may be described above in references to FIGS. 4A-4C and duplicate discussion thereof may be omitted herein for the purposes of discussing FIGS. 14A-14B.

As shown in FIG. 14A, the shroud 400 includes a tubular main body 402. At one end, the main body 402 comprises a locking section 406 with a mating end 406a. A threaded section 402a resides at the opposing end of the main body 402. The shroud 400 further includes a locking mechanism 404 that is slidable along the main body 402. A biasing member (not shown) is coupled to the main body 402 and resides between the locking section 406 and the locking mechanism 404. Similar to shroud 20 described herein, the locking mechanism 404, locking section 406, and biasing member may function together as a "push-pull" latching mechanism to secure the removable shroud 400 to a remote radio unit 30. In some embodiments, the shroud 400 also includes a coupling nut 408, coupling mechanism 407, and coupling gasket 405. The coupling nut 408 is configured to be screwed onto the threaded section 402a of the main body 402. Similar to the shrouds 20, 200, 300 described herein, as the coupling nut 408 is threaded with the threaded section 402a, the coupling mechanism 407 squeezes the coupling gasket 405 against the ruggedized cable 14, thereby creating a seal between the shroud 400 and the cable 14. FIG. 14B shows the removable shroud 400 in combination with an active optical cable assembly 10 of the present invention.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An active optical cable assembly, the assembly comprising:
   a fixed active optical connector having a transceiver;
   a ruggedized optical fiber cable integrated with the fixed optical connector;
   a main cable assembly comprising one or more optical fiber cables, wherein the ruggedized cable is spliced to the main cable assembly; and
   a removable shroud having a main body configured to surround at least a portion of the fixed active optical connector plugged into a remote radio unit, the removable shroud comprises a locking section having a mating end configured to engage a mating interface of the remote radio unit and a locking mechanism configured to secure the removable shroud to the remote radio unit, the locking mechanism being slidable and rotatable relative to a longitudinal axis of the main body,
   wherein the removable shroud further comprises a biasing member coupled to the main body, the biasing member is configured to push the locking mechanism away from the locking section to help disengage the removable shroud from the remote radio unit.

2. The active optical cable assembly of claim 1, wherein the fixed optical connector is a small form-factor pluggable (SFP) optical connector.

3. The active optical cable assembly of claim 1, further comprising a pull tab coupled to the fixed optical connector.

4. The active optical cable assembly of claim 1, wherein the locking section is at one end of the main body, and wherein the removable shroud further comprises:
   a threaded section at the opposing end of the main body; and
   a coupling nut with a coupling gasket, the coupling nut configured to be threaded with the threaded section of the main body.

5. The active optical cable assembly of claim 1, wherein the removable shroud comprises:

a metallic portion configured to surround at least a portion of the fixed active optical connector and be secured to the remote radio unit by a mating end;

a polymeric strain relief section configured to bend with the ruggedized cable; and a coupling nut configured to be threaded with a threaded section of the metallic portion.

6. The active optical cable assembly of claim 1, wherein the removable shroud comprises features configured to protect the fixed optical connector from vibration and/or mechanical shock.

7. The active optical cable assembly of claim 1, wherein the removable shroud is formed from a polymeric material.

8. The active optical cable assembly of claim 1, wherein the removable shroud comprises:

a main body having an inner cavity configured to fit at least a portion of the fixed active optical connector;

a latching mechanism pivotably coupled to the main body, the latching mechanism comprising a latch at one end configured to secure the shroud to a remote radio unit.

9. The active optical cable assembly of claim 8, wherein the opposing end of the latching mechanism comprises a pull tab.

10. The active optical cable assembly of claim 1, wherein the main cable assembly is an optical cable assembly.

11. The active optical cable assembly of claim 1, wherein the main cable assembly is a hybrid cable assembly.

12. The active optical cable assembly of claim 1, further comprising an end cap configured to fit around the fixed optical connector.

13. The active optical assembly of claim 12, wherein the end cap forms an interference fit with the fixed optical connector.

14. The active optical assembly of claim 1, wherein the removable shroud is configured to form an interference fit with the fixed active optical connector.

15. An active optical cable and remote radio unit system, the system comprising:

a remote radio unit having at least one input port; and an active optical cable assembly, the assembly comprising:

a fixed active optical connector having a transceiver, the fixed optical connector being a small form-factor pluggable (SFP) active optical connector configured to be plugged into the at least one input port of the remote radio unit;

a ruggedized cable integrated with the fixed active optical connector;

a main cable assembly, wherein the ruggedized cable is spliced to main cable assembly; and a removable shroud comprising:

a tubular main body, the main body comprising a locking section at one end and a threaded section at the opposing end, the locking section having a mating end configured to engage a mating interface of the remote radio unit;

a locking mechanism configured to secure the removable shroud to the remote radio unit, the locking mechanism being slidable and rotatable relative to a longitudinal axis of the main body;

a biasing member coupled to the main body configured to push the locking mechanism away from the locking section when the removable shroud is disengaged from the remote radio unit; and a coupling nut with a coupling gasket, the coupling nut configured to be threaded with the threaded section of the main body, wherein the fixed active optical connector is plugged into the at least one input port of the remote radio unit, and wherein the removable shroud surrounds at least a portion of the fixed active optical connector and is secured to the remote radio unit, thereby protecting the connection between the fixed active optical connector and the remote radio unit.

16. The active optical cable and remote radio unit system of claim 15, wherein the removable shroud comprises features configured to protect the connection between the fixed optical connector and the remote radio unit from vibration and/or mechanical shock.

17. The active optical cable and remote radio unit system of claim 15, wherein at least a portion of the removable shroud is formed from a metallic material, wherein the metallic portion of the removable shroud surrounds at least a portion of the fixed optical connector and is secured to the remote radio unit.

18. The active optical cable and remote radio unit system of claim 17, wherein the removable shroud comprises a polymeric strain relief section.

19. The active optical cable and remote radio unit system of claim 15, wherein the main cable assembly is an optical cable assembly.

20. The active optical cable and remote radio unit system of claim 15, wherein the main cable assembly is a hybrid cable assembly.

* * * * *